(12) United States Patent
Yoo et al.

(10) Patent No.: US 9,098,740 B2
(45) Date of Patent: Aug. 4, 2015

(54) APPARATUS, METHOD, AND MEDIUM DETECTING OBJECT POSE

(75) Inventors: Byung In Yoo, Hwaseong-si (KR); Chang Kyu Choi, Seoul (KR); Jae Joon Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 13/541,126

(22) Filed: Jul. 3, 2012

(65) Prior Publication Data

US 2013/0028517 A1    Jan. 31, 2013

(30) Foreign Application Priority Data

Jul. 27, 2011  (KR) .................. 10-2011-0074546

(51) Int. Cl.
G06K 9/34 (2006.01)
G06K 9/00 (2006.01)

(52) U.S. Cl.
CPC .................................. *G06K 9/00375* (2013.01)

(58) Field of Classification Search
USPC .................................. 382/154, 173, 305, 306
See application file for complete search history.

(56) References Cited

U.S. PATENT DOCUMENTS

| 6,459,824 B1* | 10/2002 | Lee et al. ................ 382/305 |
| 6,557,010 B1 | 4/2003 | Kim et al. |
| 6,771,818 B1 | 8/2004 | Krumm et al. |
| 2008/0089579 A1 | 4/2008 | Han et al. |
| 2008/0310720 A1 | 12/2008 | Park et al. |
| 2010/0111370 A1 | 5/2010 | Black et al. |
| 2010/0215271 A1 | 8/2010 | Dariush et al. |
| 2010/0238168 A1 | 9/2010 | Kim et al. |
| 2010/0259546 A1 | 10/2010 | Yomdin et al. |
| 2010/0303303 A1 | 12/2010 | Shen et al. |
| 2011/0025834 A1 | 2/2011 | Chen et al. |

FOREIGN PATENT DOCUMENTS

| KR | 1020010026651 | 4/2001 |
| KR | 1020050065198 | 6/2005 |
| KR | 1020090119442 | 11/2009 |
| WO | WO 2006/099597 A2 | 9/2006 |

OTHER PUBLICATIONS

PCT International Search Report issued Jul. 21, 2012, in corresponding PCT Patent Application No. PCT/KR2012/004909.

Christian Plagemann et al., "Real-Time Identification and Localization of Body Parts from Depth Images," Artificial Intelligence Laboratory, Stanford University, Stanford, CA 94305, USA.

(Continued)

*Primary Examiner* — Duy M Dang
(74) *Attorney, Agent, or Firm* — NSIP Law

(57) ABSTRACT

An apparatus and method detecting an object pose are provided. Key joint data of an object may be extracted, a candidate pose may be generated based on the extracted key joint data, and a most likely pose may be retrieved using a database, based on the generated candidate pose.

45 Claims, 17 Drawing Sheets

(56) References Cited

OTHER PUBLICATIONS

Hee-Deok Yang et al., "Reconstruction of 3D human body pose from stereo image sequences based on top-down learning," Pattern Recognition: The Journal of the Pattern Recognition Society, Department of Computer Science and Engineering, Korea University, Anamdong, Seongbuk-ku, Seoul 136-713, Republic of Korea, Received Oct. 22, 2005; received in revised form Dec. 26, 2006; Accepted Jan. 10, 2007.

Jehee Lee, "Introduction to Data-Driven Animation: Programming with Motion Capture," Seoul National University, pp. 1-50.

Xiaolin K. Wei et al., "Intuitive Interactive Human-Character Posing with Millions of Example Poses," Published by the IEEE Computer Society, Jul./Aug. 2011, pp. 78-88.

U.S. Appl. No. 13/290,623, filed Nov. 7, 2011, Jae Joon Han et al.

Supplementary Partial European Search Report issued on Apr. 24, 2015 in counterpart European Application No. 12617346.5 (11 pages, in English).

Haritaoglu, Ismail, David Harwood, and Larry S. Davis. "Ghost: A human body part labeling system using silhouettes." *Pattern Recognition, 1998. Proceedings. Fourteent International Conference on.* vol. 1. IEEE, 1998. (6 pages, in English).

Iwasawa, Shoichiro, et al., "Real-time estimation of human body posture from monocular thermal images." *Computer Vision and Pattern Recognition, 1997. Proceedings., 1997 IEEE Computer Society Conference on.* IEEE, 1997. (6 pages, in English).

Li, Zhenning, and Dana Kulic. "Local shape context based real-time endpoint body part detection and identification from depth images." *Computer and Robot Vision (CRV), 2011 Canadian Conference on.* IEEE, 2011. (8 pages, in English).

\* cited by examiner

APPARATUS, METHOD, AND MEDIUM DETECTING OBJECT POSE

CROSS-REFERENCE TO RELATED APPLICATIONS

This application claims the benefit of Korean Patent Application No. 10-2011-0074546, filed on Jul. 27, 2011, in the Korean Intellectual Property Office, the disclosure of which is incorporated herein by reference.

BACKGROUND

1. Field

One or more embodiments of the following description relate at least to an apparatus, method, and medium detecting an object pose.

2. Description of the Related Art

Since humans use both of their eyes in their daily lives, they may recognize human body poses quite well at short and long distances, e.g., even with low resolution or limited information. However, in a computational vision system, it is difficult to recognize different human body poses, though such recognitions may be desired in various fields.

To solve such a problem, a conventional model-based approach has been generally used to solely recognize different poses. The conventional model-based approach fits a human body model to an input image by measuring the similarity between the overlap of a human body model and an associated image region. However, it is difficult to apply the conventional model-based approach to distinguish between complex poses, such as sitting or lying down poses where different body parts have overlapping depths, thereby generating a large number of occlusions of respective overlapped body parts, such as in the movements of the body parts when practicing yoga or stretching, where it is common for different body parts to overlap when viewed from a particular view point. Additionally, since the conventional model-based approach typically requires high computational capabilities, it is difficult to apply the conventional model-based approach to an embedded environment, e.g., a computational system designed for specific control functions within a larger system or complete device often including hardware and potentially mechanical parts. The tracking of body parts or poses is similarly difficult when there are quick movements that require such high computational capabilities. In addition, the conventional model-based approach is not robust against segmentation errors, e.g., errors in the determined extent, periphery, or contour, as only examples, of a portion of an image that is set to be segmented or separately identified compared to a remainder of the image.

SUMMARY

The foregoing problems or difficulties may be overcome and/or other aspects achieved by providing an apparatus, the apparatus including a key joint detector to analyze an image to detect key joint data regarding respective plural key joints of an object in the image, a database to store respective information of plural object poses representing potential poses of one or more objects, and a pose retriever to retrieve and output from the database a most likely pose, of the plural object poses, based on the detected key joint data, with the most likely pose having a determined highest similarity to an actual pose of the object.

The foregoing problems or difficulties may be overcome and/or other aspects achieved by providing method, the method including analyzing an image to detect key joint data regarding respective plural key joints of an object in the image, and retrieving and outputting from a database, storing respective information of plural- object poses representing potential poses of one or more objects, a most likely pose, of the plural object poses, based on the detected key joint data, wherein the most likely pose is a pose with a determined highest similarity to an actual pose of the object.

Additional aspects, features, and/or advantages of one or more embodiments will be set forth in part in the description which follows and, in part, will be apparent from the description, or may be learned by practice of the one or more embodiments.

BRIEF DESCRIPTION OF THE DRAWINGS

These and/or other aspects and advantages will become apparent and more readily appreciated from the following description of one or more embodiments, taken in conjunction with the accompanying drawings of which.

DETAILED DESCRIPTION

Figure 1:
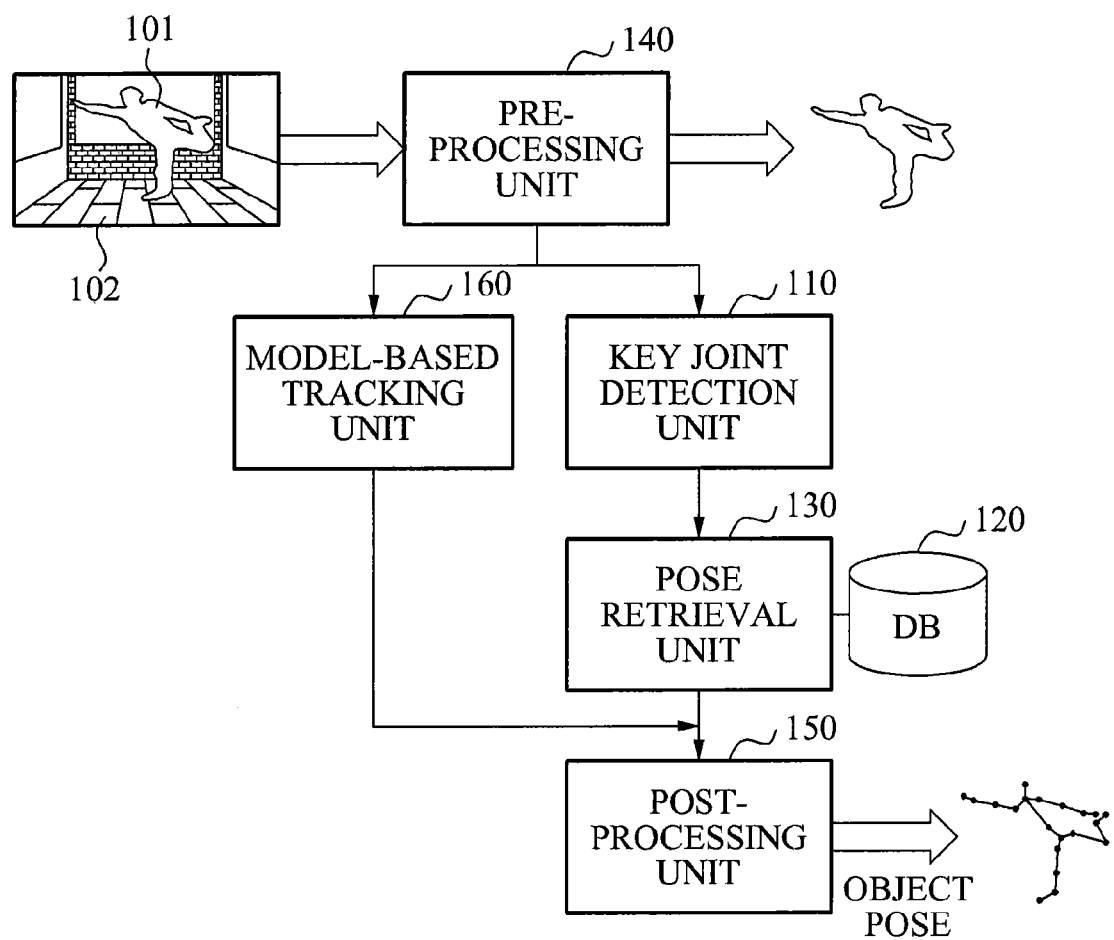
FIG. 1 illustrates an object pose detection apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an object pose detection apparatus, according to one or more embodiments. The object pose detection apparatus of FIG. 1 may detect key joint data of an object 101 from a depth image 102. Additionally, the object pose detection apparatus of FIG. 1 may retrieve a most likely pose with a determined highest similarity to the object 101, from a database 120, based on the detected key joint data. Accordingly, the object pose detection apparatus of FIG. 1 may detect a determined most similar pose, for example, to the object 101. Hereinafter, one or more operations of such components of the object pose detection apparatus of FIG. 1 will be described in greater detail, according to one or more embodiments.

The object pose detection apparatus of FIG. 1 may include a key joint detector 110, the database 120, and a pose retriever 130, for example. The key joint detector 110 may detect key joint data of the object 101 from the depth image 102. The object 101 may represent a person, an inanimate object, and the like, that may be included in a pre-recorded image or a real-time image that is input in real time from a camera. Key joints may be found to be, for example, an end part and a connection part of the object 101, and the like.

The database 120 may store information of one or more predefined object poses, with at least one of the predetermined object poses potentially being determined to be associated with the object 101, e.g., determined to be a most likely pose of the observed object 101. For example, the associated object pose may be determined to be one or more of the predefined poses that may have been generally determined to be associated with the object 101. In an embodiment, the associated object pose may represent a pose in which default key joints, i.e., set in advance, of the one or more predefined poses do not overlap. A default key joint may include, as only examples, a head 211, hands 212 and 213, and feet 214 and 215 extremity parts of the illustrated object shown in FIG. 2. In this or another embodiment, the associated object pose may represent a pose selected from among poses that are frequently associated with the object 101, in real world, such as based upon the underlying sport or stretching activity of a user represented by the object. Here, a user of the object pose detection apparatus may also selectively identify which of the predefined object poses should be associated with the observed object 101.

The pose retriever 130 may retrieve the pose, e.g., of the predefined object poses, that has the highest determined similarity to the object 101, using the database 120, based on the key joint data.

The pose retriever 130 may identify the predefined object pose that has the highest determined similarity according to various schemes. For example, the pose retriever 130 may identify at least one candidate pose from the predefined object poses, and may identify the most likely pose of the object 101 using the identified at least one candidate pose.

To generate, e.g., identify, the at least one candidate pose for the object 101, the pose retriever 130 may use a scheme of applying a constraint Inverse Kinematics (IK) to the key joint data, and a scheme of statistically extracting at least one candidate pose for the object 101 from the database 120 based on the key joint data. Such a constraint IK may include a reversal of predefined kinematics equations that define a chain of joint parameters, for example, for one or more known respective poses of one or more body parts, to identify potential joint angles or relative positional relationship between body parts, resulting in different candidate poses for the object. As only an example, kinematics equations may define loop equations, e.g., with non-linear constraints on the configuration of respective independent parameters, of a complex articulated system. The differing parameters in kinematic equations may also be known as the degrees of freedom (DOF) of the corresponding joint or system. One or more further examples of generating a candidate pose will be described in greater detail below.

In an embodiment, the pose retriever 130 may identify, as the most likely pose, a pose determined to have the highest similarity to the object 101 from the generated candidate poses, using the database 120. In this or another embodiment, the pose retriever 130 may identify the most likely pose from the generated candidate poses, using weighting factors. One or more examples of retrieving a most likely pose will be described in greater detail below.

The object pose detection apparatus of FIG. 1 may further include a pre-processing element 140, for example. The pre-processing element 140 may extract or segment the object 101 from a pre-recorded image or a real time image.

Additionally, the object pose detection apparatus of FIG. 1 may further include a post-processing element 150, for example. The post-processing element 150 may perform pose warping, as discussed in greater detail below, on the most likely pose retrieved by the pose retriever 130. Additionally, the post-processing element 150 may perform high-speed sampling on the most likely pose on which the pose warping is performed. Furthermore, the post-processing element 150 may calculate a momentum for the object 101.

Figure 13:
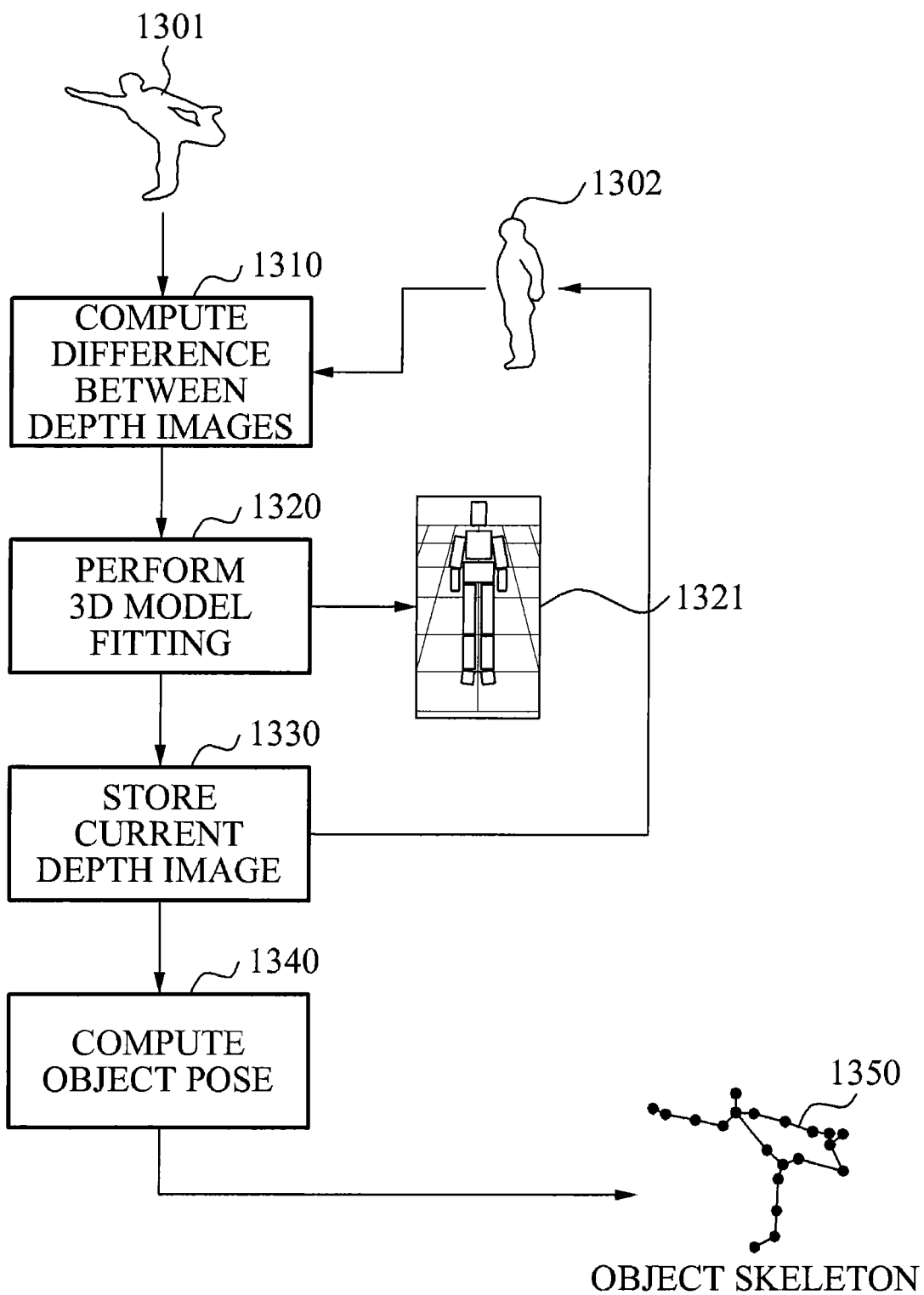
FIG. 13 illustrates operations, as only examples, of a model-based tracker, e.g., available for use in the object pose detection apparatus of FIG. 1, according to one or more embodiments.

In addition to the above one or more embodiments, such an object pose detection apparatus may additionally include a model-based tracker 160. The model-based tracker 160 may track the object pose based on a model that is associated with the object 101 and that is stored in the database 120, such as a modeling based upon a determined difference between current and previous depth images of an object, such as shown in FIG. 13 with regard to object 1302, and a fitting on the 3D model 1321 according to the determined difference.

Figure 2:
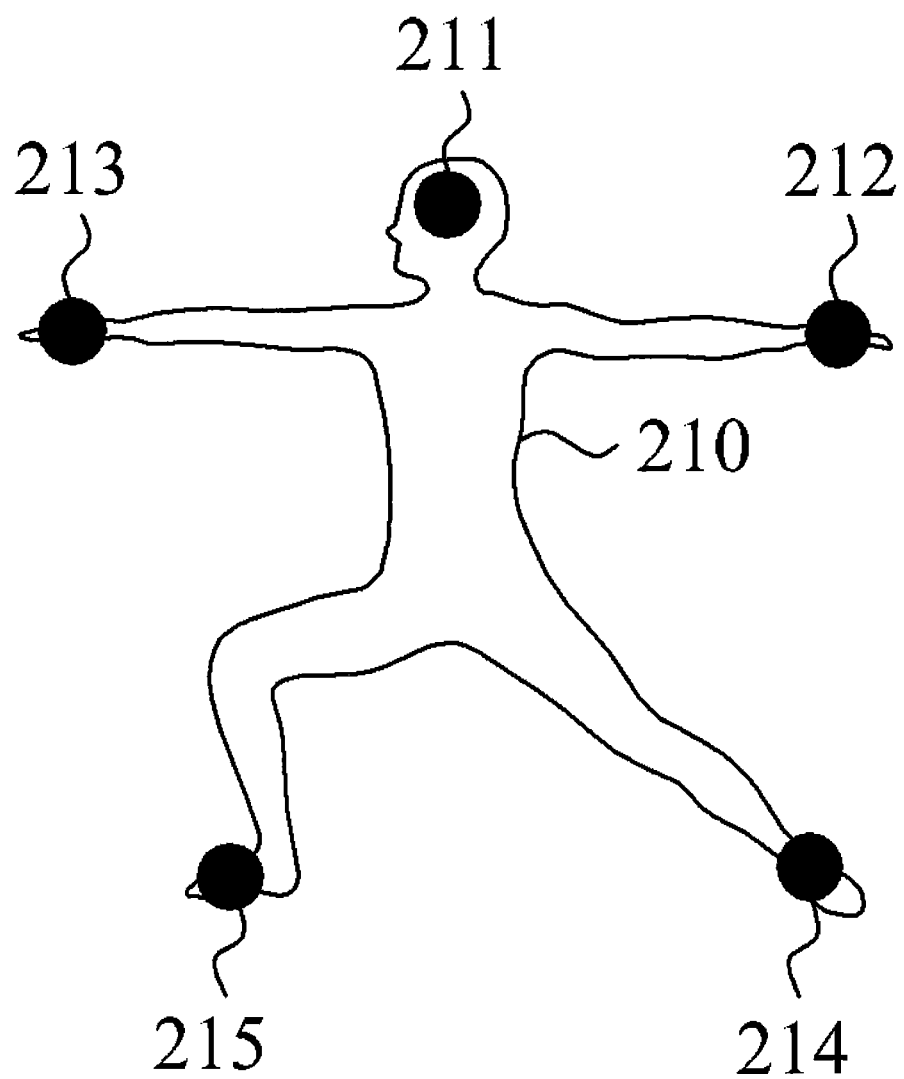
FIGS. 2 and 3 illustrate respectively posed objects each demonstrating respective key joints, as only examples, according to one or more embodiments.
Figure 3:
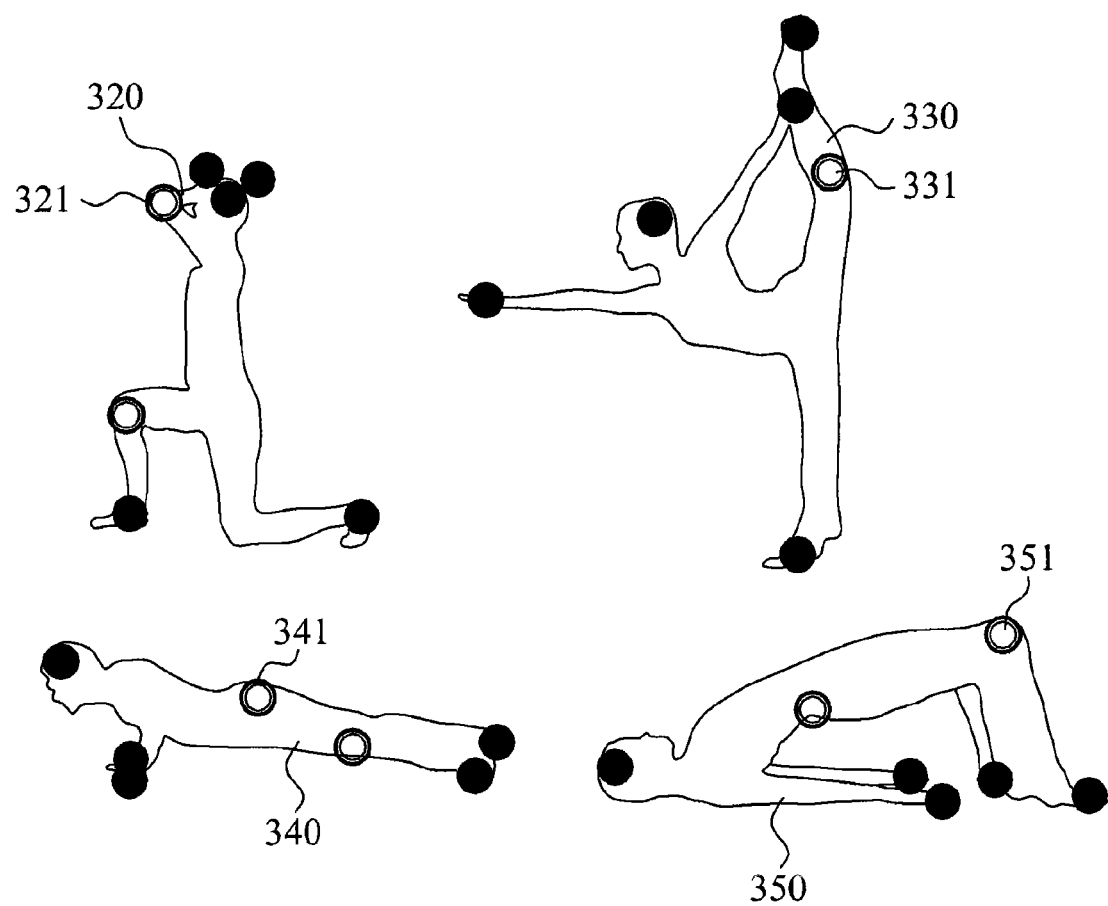

FIGS. 2 and 3 illustrate respectively posed objects each demonstrating respective key joints, as only examples, according to one or more embodiments. Referring to FIGS. 2 and 3, when the object is a person 210, the observed head 211, hands 212 and 213, and feet 214 and 215, as extremities, may be regarded as key joints. As only an example, when at least one extremity body part among the head 211, the hands 212 and 213, and the feet 214 and 215 is hidden, i.e., occluded, by another body part of the person 210, another part of the body, among the viewed body parts may equally be considered a key joint. Depending on how the body parts of the person are seen, the end part may include, for example, a knee, an elbow, a shoulder, a portion of the waist, and the like.

In an embodiment, such as shown in FIG. 3, an elbow 321 may be regarded as a key joint in the first pose 320, since the hands 212 and 213 overlap the head 211. In this or another embodiment, a knee 331 may be regarded as a key joint in the second pose 330, since the head 212 overlaps the foot 214. In any/all of these or still another embodiment, buttocks 341 may be regarded as a key joint in the third pose 340, since both hands 212 and 213 overlap each other and both feet 214 and 215 overlap each other. In any/all of these or yet another embodiment, a knee 351 may be regarded as a key joint in the fourth pose 350, since both hands 212 and 213 overlap each other and both feet 214 and 215 overlap each other.

Accordingly, the person 210 may perform both a simple pose of FIG. 2 in which no default key joints overlap, and complex poses of FIG. 3 in which one or more default key joints are occluded, i.e., where the one or more default key joints are blocked by another body part or some other object when viewed from a certain viewpoint. In an embodiment of a complex pose, such as the first pose 320 through the fourth pose 350, and the like, when left and right hands or feet extremity parts have been brought together to be considered physically at a same place, only one of the respective extremity parts is visible from a particular viewpoint and only the visible extremity part would be set to be a key joint. However, the overlapped extremity part of the body, i.e., in a similar position to the existing key joint of the visible extremity part, may still be included as an additional key point even though that corresponding extremity part is not visible, or another key joint on a viewable body part closest to the non-visible extremity body part may be set.

Hereinafter, one or more operations of components of an object pose detection apparatus, such as the object pose detection apparatus of FIG. 1, will be further described with reference to FIGS. 4 through 14 and 16A-B.

Figure 4:
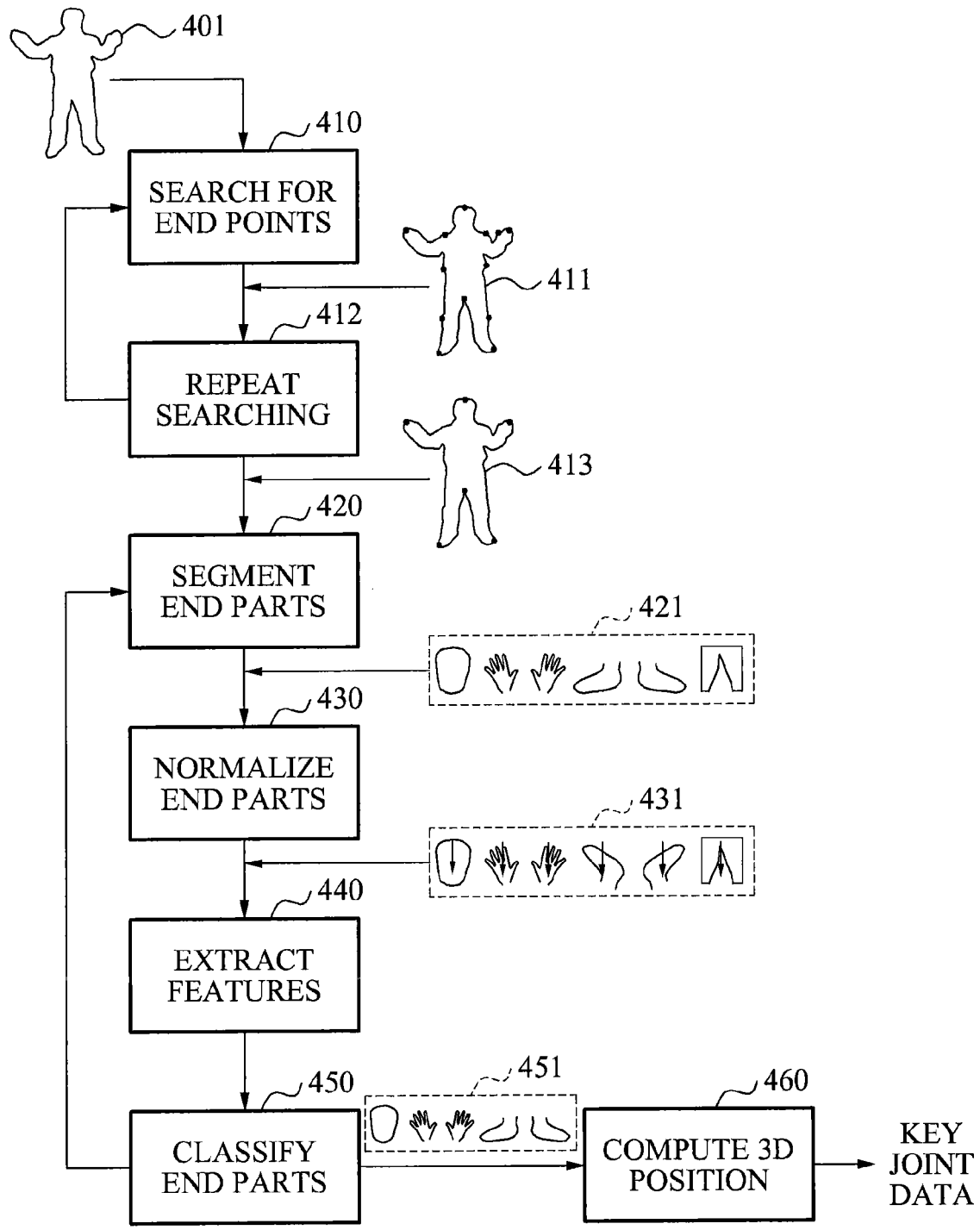
FIGS. 4-6 illustrate operations, as only examples, of respective key joint detectors, e.g., available for use in the object pose detection apparatus of FIG. 1, according to one or more embodiments.
Figure 5:
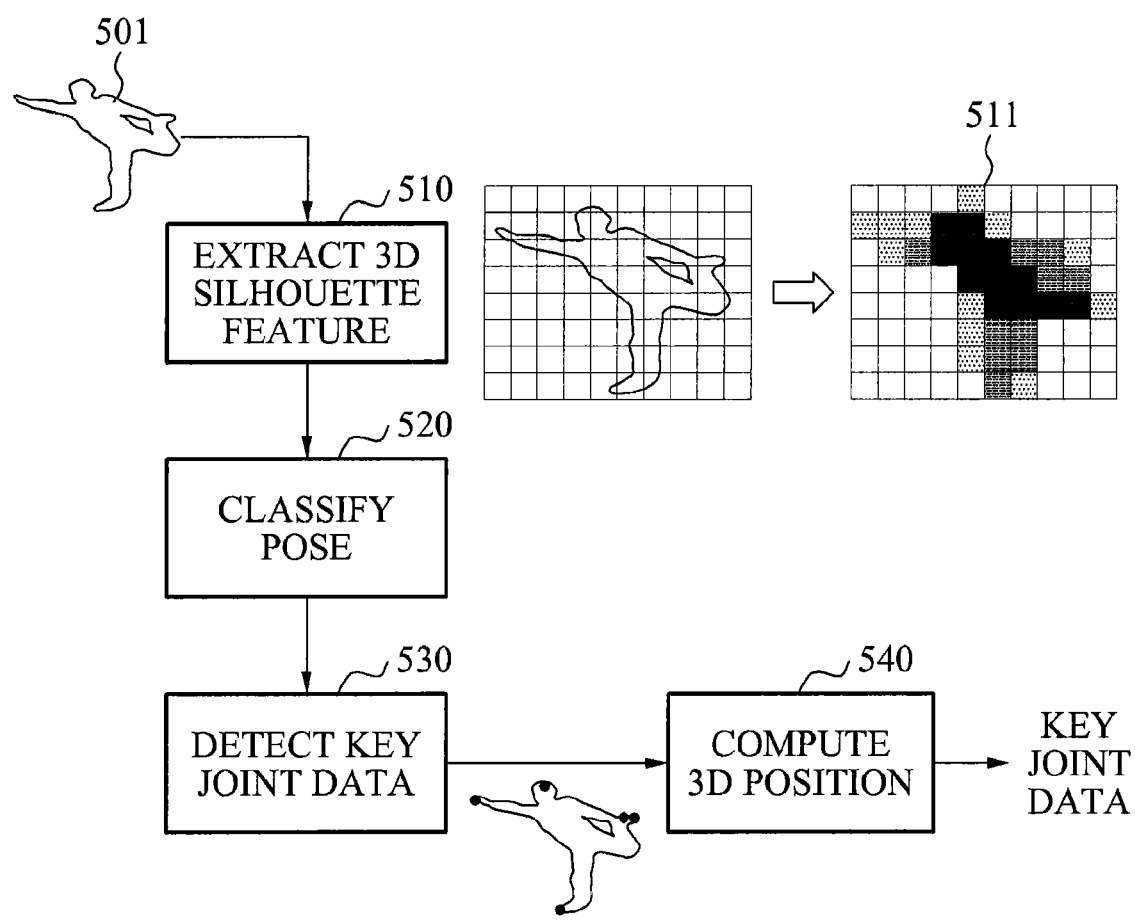
Figure 6:
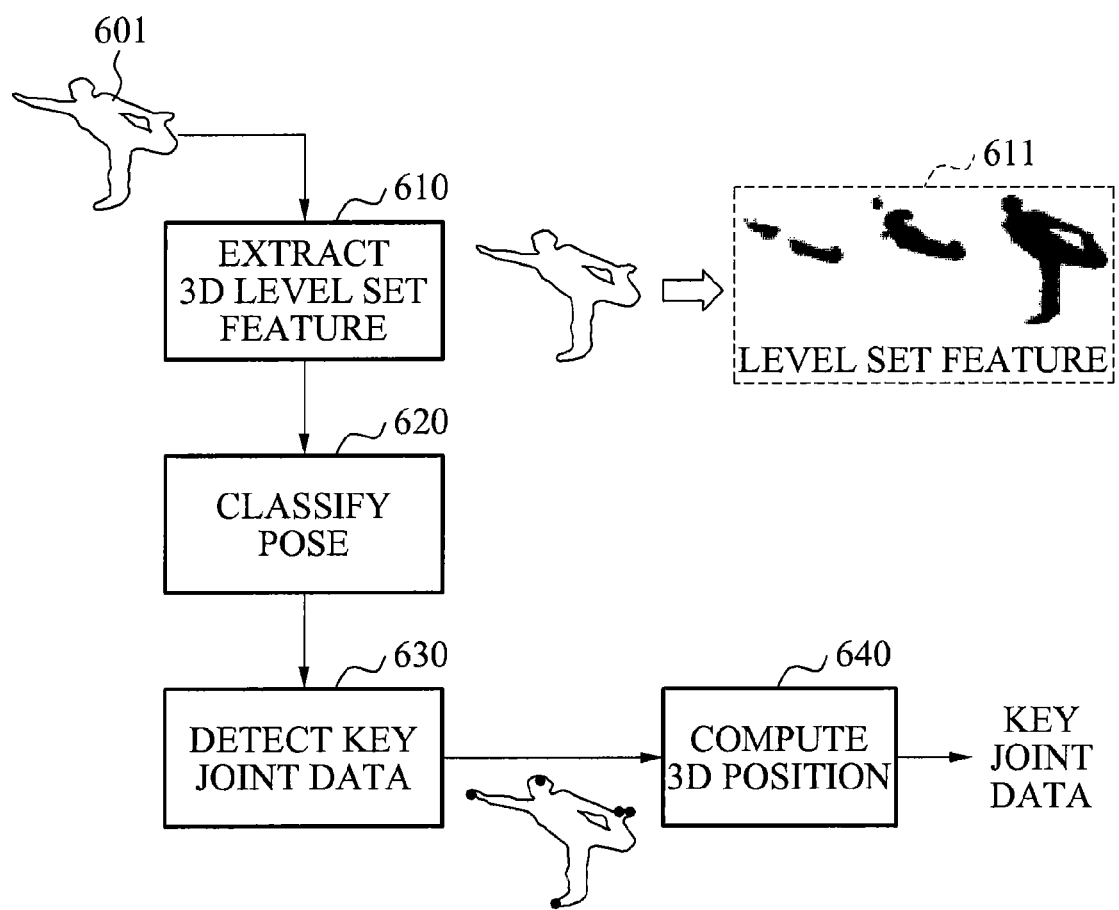

Below, FIGS. 4-6 illustrate operations for key joint detection methods, e.g., available for use in one or more key joint detectors, such as the key joint detector 101 of the object pose detection apparatus of FIG. 1, according to one or more embodiments. Herein, though the object pose detection apparatus of FIG. 1 may be referenced to with regard to different potential method operations of one or more embodiments, this reference is only intended to be for illustrative purposes and is not intended to limit any of the method operations described herein to a particular device, apparatus, or system.

Referring to FIG. 4, in operation 410, "end points" of the illustrated object 401 may be searched, such as by the key joint detector 110. Depending on embodiment, searching by the key joint detector 110 for the end points of the object 401 may be performed using a 3D connected component, for example. The end points may refer to extremity parts of a body of the object 401, for example a crown of a head, left and/or right fingertips, left and/or right tiptoes, and the like. Additionally, the extremity parts may also more generally refer to body parts that correspond to the end points and that include for example a head, left and/or right hands, left and/or right feet, and the like.

Operation 412 may be implemented to control the repetition of operation 410, for improving the search rate of end points. For example, referring to the illustrated image 411, resulting from implementing operation 410 once to search for end points, body parts, such as points on sides of the body, a shoulder, a knee, an elbow, and the like, may have been found to be end points of the object 401, in addition to the contour following head (namely, the crown of the head), left and/or right fingertips, left and/or right tiptoes, and crotch end points. However, in one or more embodiments, after implementation of operation 412, for example, and as illustrated in image 413, resulting from repeatedly searching for end points, only the end of the head, left and/or right fingertips, left and/or right tiptoes, and crotch end points may be found to be the end points of object 401, and thus the search rate may be improved.

Operation 420 may thereafter be performed to segment from an image, e.g., a depth image, including the object 401 respective images each showing respective extremity parts corresponding to the determined end points, e.g., from the image of the object 401, when operations 410 or 412 are completed. For example, the respective segmented images 421 demonstrate segmented respective images of the extremity parts, namely the head, left and/or right hands, left and/or right feet, and crotch, that correspond to the determined end points, e.g., as determined by operation 412.

The respective segmented images 421 may thereafter be normalized, in operation 430. Here, the original orientation of directions, angles, up and down positions, and the like, for any of the extremity parts of the object 401 may be different with respect to each other and potentially from predefined poses. For example, when the segmented image 421 is the image of the head of the object 401, the direction of the head in the segmented image 421 of the head will vary corresponding to the direction that the head of object 401 is oriented, e.g., as in a direction the user may be looking when the image of the object 401 is captured by a camera of the object pose detection apparatus of FIG. 1, which may actually a direction or orientation different from a direction or orientation of other extremity parts shown in their respective segmented images 421. Accordingly, to improve an accuracy of an extracting of a feature of an extremity part, the respective segmented images 421 may be normalized to be facing the same direction or have the same orientation.

Thereafter, features of extremity parts, now represented in respective normalized segmented images 431, resulting from respective normalizations in operation 430, may then be respectively extracted from each respective normalized segmented image 431. In an embodiment, the key joint detector 110 may extract, from the respective normalized segmented images 431, shape-based features of each extremity part, for example Haarlets, curvatures, Histogram of Gradient (HoG), and the like. In this or another embodiment, the key joint detector 110 may extract 3D features from each of the respective normalized segmented images 431, for example 3D Haarlets, level set features, and the like, noting that alternative embodiments are equally available.

The respective extremity parts may then be classified, in operation 450, based on the respective extracted features extracted from the respective normalized segmented image 431, e.g., in order to increase an accuracy of detecting key joint data. As only an example, the key joint detector 110 may determine (classify) which predefined body part is represented by each of the normalized segmented images 431, based on the respective extracted features. For example, when it is determined that a feature associated with a head has been extracted from a particular segmented image, the key joint detector 110 may classify the extremity part in that particular segmented image to be a head. As only examples, and noting that alternative embodiments are also available, depending on embodiment, the key joint detector 110 may perform such classifying of extremity parts by using an Adaptive Boosting (Adaboost) learning algorithm, a decision tree leaning algorithm, a random forest classifier, and the like. An image 451 may show the classified extremity parts.

Operation 460 may be performed to calculate a 3D position of the classified extremity parts shown in the image 451, e.g., to detect the key joint data of the object 401. As only an example, operation 460 may be performed by the key joint detector 110. Depending on embodiment, the key joint detector 110 may calculate a two-dimensional (2D) position or a 3D position of the classified extremity parts in the image 451, using a central moment, a spatial moment, a mean-shift estimator, and the like. Additionally, the key joint detector 110 may correct the calculated 3D position using a filter, such as a Kalman estimation filter.

As noted above, and only as examples, FIGS. 5 and 6 also illustrate operations for extracting features from a captured object, and detecting key joint data.

Referring to FIG. 5, a 3D silhouette feature of an object 501 may be extracted from a depth image of the object 501. In FIG. 5, the illustrated image 511 demonstrates a potential difference between partitions of a 2D image of the object 501 and corresponding depth mappings of each partition, i.e., image 511 demonstrates a 3D silhouette feature of the object 501, as only an example.

In operation 520, a pose classification process may be performed based on the 3D silhouette feature of the object 501 demonstrated in the image 511, i.e., to classify the pose of the object 501 as being one or more potential matching poses having similar 3D silhouettes as the 3D silhouette feature of the object 501, e.g., by identifying a pose class identifier(s) (ID) of the matching pose(s).

In operation 530, key joint data of the object 501 may then be read from memory, e.g., the database 120, based on the pose class ID corresponding to the classified pose. As only example, the key joint detector 110 of FIG. 1 may search the database 120 for the pose, from among a plurality of poses stored in the database 120, whose pose class ID matches the pose class ID of the classified pose, and may detect key joint data from the found pose. Depending on embodiment, the key joint detector 110, for example, may detect key joint data by searching another database, other than the database 120, which may be accessed independently from the database 120, and obtaining the key joint data from a found matching pose in the other database.

In operation 540, a 3D position of the classified pose may further be calculated, e.g., to detect the key joint data of the object 501. Accordingly, as only an example, the key joint detector 110 of FIG. 1 may detect the key joint data of the object 501 by performing the above-described operations 510 through 540.

Referring to FIG. 6, in operation 610, a 3D level set feature of an object 601 may be extracted from a depth image of the object 601. The illustrated image 611 demonstrates a detected or determined 3D level set feature of the object 601.

Accordingly, in operation 620, a pose of the object 601 is classified based on the 3D level set feature, e.g., as shown in the image 611.

Thereafter, key joint data of the object 601 from the database 120 is obtained based on a searched for pose having a pose class ID corresponding to the classified pose. As only an example, the key joint detector 110 of FIG. 1 may search the database 120 for the pose, from among a plurality of poses stored in the database 120, whose pose class ID matches the pose class ID of the classified pose, and may detect key joint data from the found pose. Depending on embodiment, the key joint detector 110 may detect key joint data by searching another database, other than the database 120, which may be accessed independently from the database 120, and obtaining the key joint data from a found matching pose in the other database.

In operation 640, a 3D position of the classified pose may then be calculated, e.g., to detect the key joint data of the object 601. Accordingly, as only an example, the key joint detector 110 may detect the key joint data of the object 601, by performing the above-described operations 610 through 640.

Similar to the above notation regarding the operations of FIG. 4, when or if the key joint detector 110 is implementing one or more of the operations of FIGS. 5 and 6, the key joint detector 110 may also extract a 3D Haarlet feature from a depth image of an object, e.g., in addition to the 3D silhouette and 3D level set features that are respectively described above regarding the operations illustrated in FIGS. 5 and 6.

Additionally, as only examples, the key joint detector 110 may use an algorithm, such as a template matching algorithm, a decision tree algorithm, a neural network algorithm, a random forest algorithm, and the like, to classify a pose of an object based on an extracted feature, noting that alternative embodiments are also available.

A key joint detector 110 described with reference one or more of FIGS. 4 through 6 may detect key joint data of an object, based on the object being extracted by a pre-processing element, such as the pre-processing element 140 in the object pose detection apparatus of FIG. 1.

To detect a more accurate pose, for example, the pre-processing element 140 may first process on an image that has been input to the key joint detector 110, for example. In an embodiment, the pre-processing element 140 may separate only a foreground (e.g., as the object) from an image including both the foreground and a background, and may output the separated foreground as the object. In this or another embodiment, the pre-processing element 140 may also normalize different scales for each image, and may output the normalized scales. Hereinafter, the former will be further described with reference to FIG. 7, and the latter will be further described with reference to FIG. 8.

Figure 7:
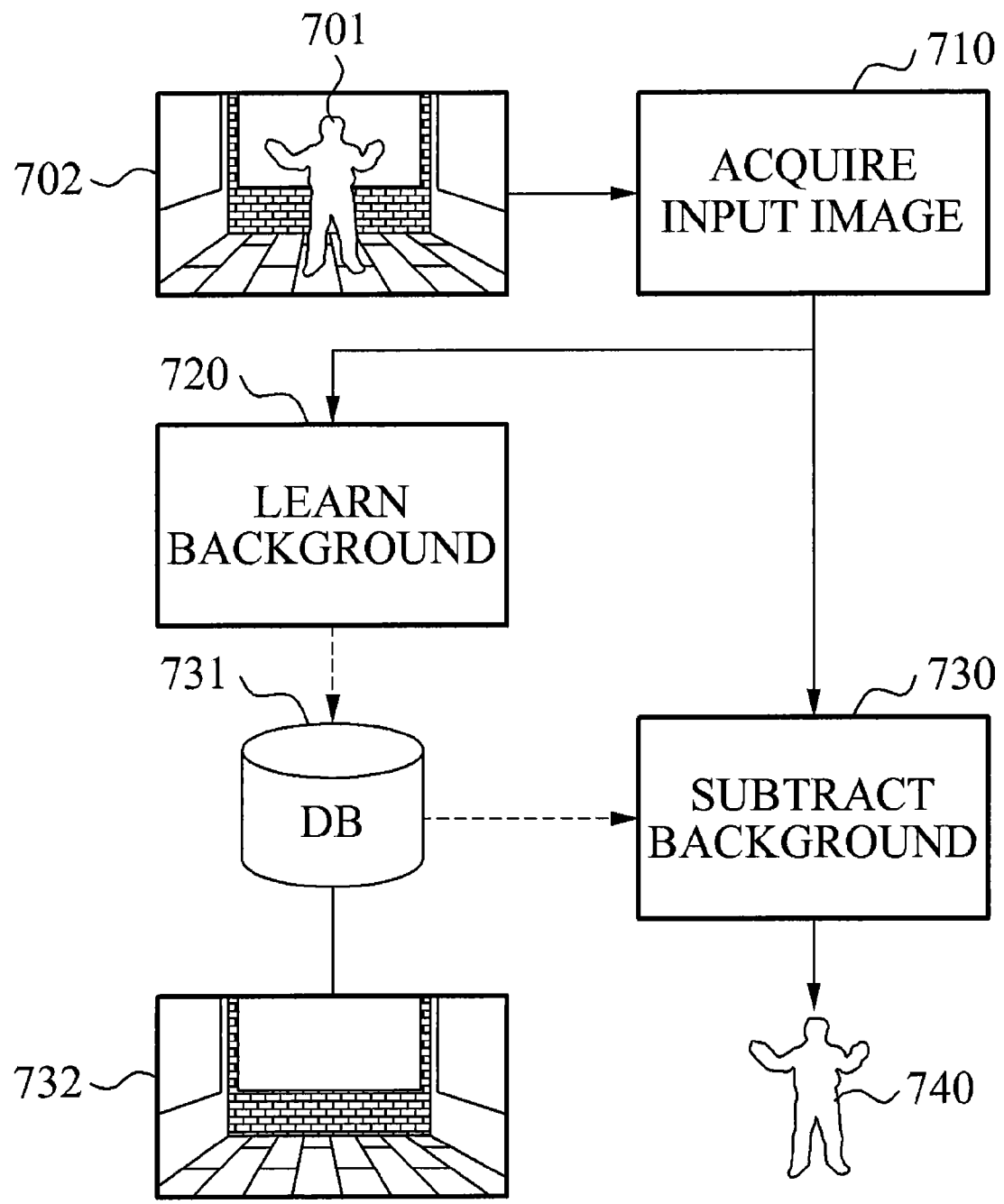
FIGS. 7 and 8 illustrate operations, as only examples, of a pre-processing element, e.g., available for use in the object pose detection apparatus of FIG. 1, according to one or more embodiments.

Referring to FIG. 7, in operation 710, an input image 702 is received, for example a pre-recorded image or a real-time image that is received in real time from a camera. As noted, operation 710 may be performed by a pre-processing element, such as the pre-processing element 140 of FIG. 1, according to one or more embodiments. Operations 720 and 730 will be described in greater detail below, noting that operations 720 and 730 may also be performed by the pre-processing element 140.

In operation 720, a background may be learned from the input image 702. Depending on embodiment, to learn a background, the pre-processing element 140 may record an average background depth map in a depth sequence of a predetermined number of frames in the input image 702. Thereafter, the pre-processing element 140 may determine whether a depth value of each pixel, for example, in the input image 702 is within a determined proximity to the camera. When it is determined that a depth value of a pixel is within the determined proximity to the camera, the pre-processing element 140 may identify the pixel as being a foreground pixel. Additionally, the pre-processing element 140 may store such a learned background in a database 731. FIG. 7 also illustrates an example of the learned background as image 732.

In operation 730, the learned background may then be subtracted from the input image 702, so that a foreground of the input image 702 may be distinguished from the background of the input image 702. As only an example, the pre-processing element 140 may subtract the learned background from the input image 702, and output the foreground as an object 740 for which pose estimation is thereafter performed.

Figure 8:
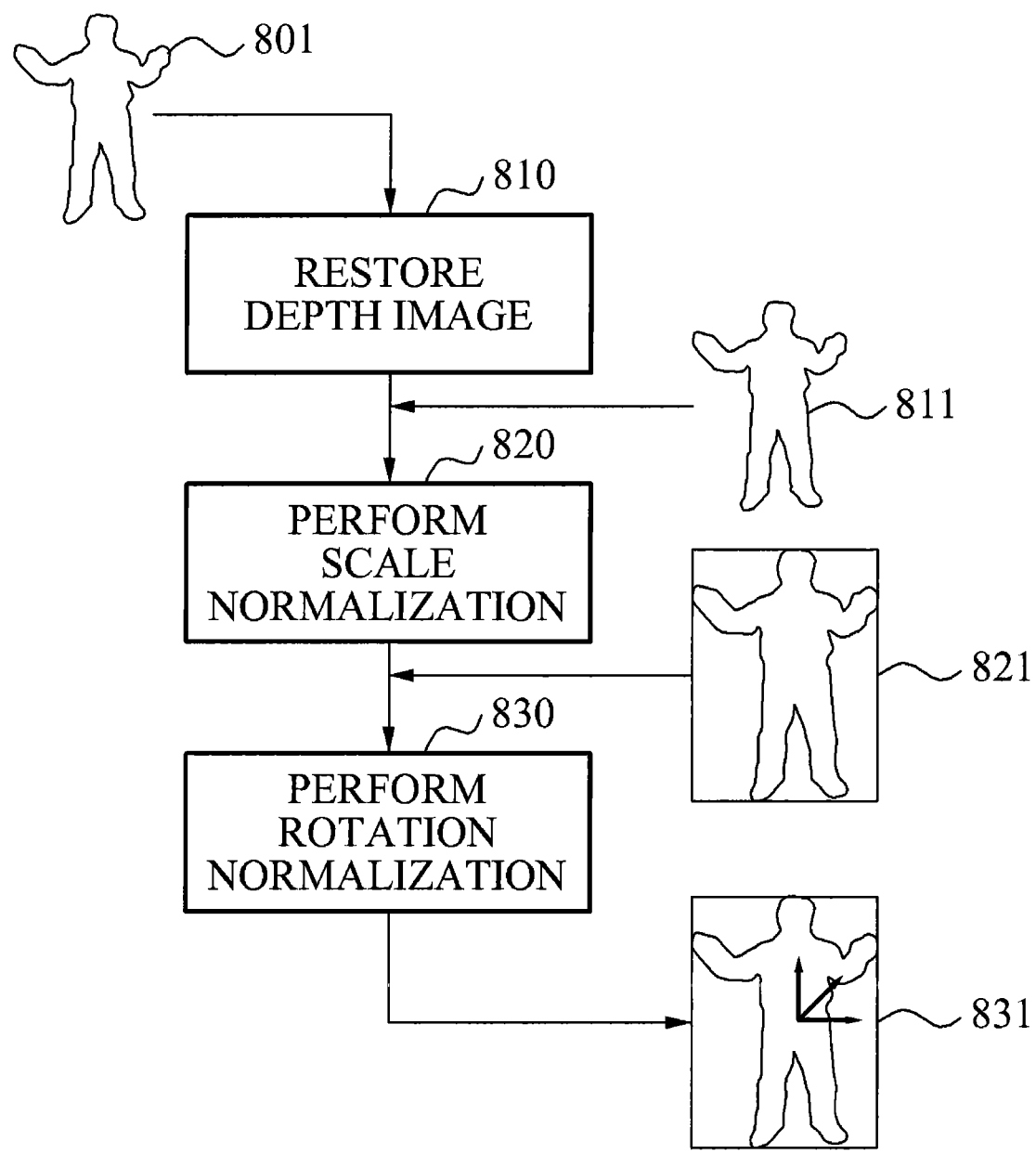

As noted, referring to FIG. 8, operation 810 may be performed by a pre-processing element, such as the pre-processing element 140 of FIG. 1, to remove noise of an object 801 from an input image, according to one or more embodiments. As only examples, the below described operations 820 and 830 may be performed by the pre-processing element 140. In an embodiment, in operation 810, the pre-processing element 140 may perform a de-noising operation, such as hole filling and the like, and may remove the noise of the object 801. In this or another embodiment, the pre-processing element 140 may thereby restore a part of a body of the object 801 that may have been cut by a Field of View (FoV) of a camera, an obstacle, and the like, so that the illustrated restored object 811 may be obtained.

In operation 820, the restored object 811 may be scale normalized. Depending on embodiment, the pre-processing element 140 may perform such scale normalization on the restored object 811, e.g., based on reference ratios sX and sY, as only examples. Accordingly, a user may observe that sensing performance and recognizing performance remain the same, or substantially the same, regardless of the underlying human body proportions in the captured image, and regardless of respective distances of one or more portions of the body from the capturing camera(s). Here, the illustrated image 821 may represent an example of an image to which the scale normalization has been applied.

In operation 830, scale normalized image 821 may also be rotation normalized. Depending on embodiment, the preprocessing element 140 may detect or calculate a primary axis, through an application of a main axis of the image 821, for example by applying a Primary Component Analysis (PCA) with respect to a pixel vector space, and may perform rotation normalization to enable rotation around a reference axis. Therefore, with such rotation normalization, a user may observe that sensing performance and recognizing performance remain the same, or substantially the same, regardless of a respective position and orientation of the object 801. The illustrated image 831 may represent an example of an image to which the rotation normalization has been applied. Depending on embodiment, and only as an example, the image 831 may be input to the key joint detector 110 as the object for which pose estimation is to be performed.

Figure 9:
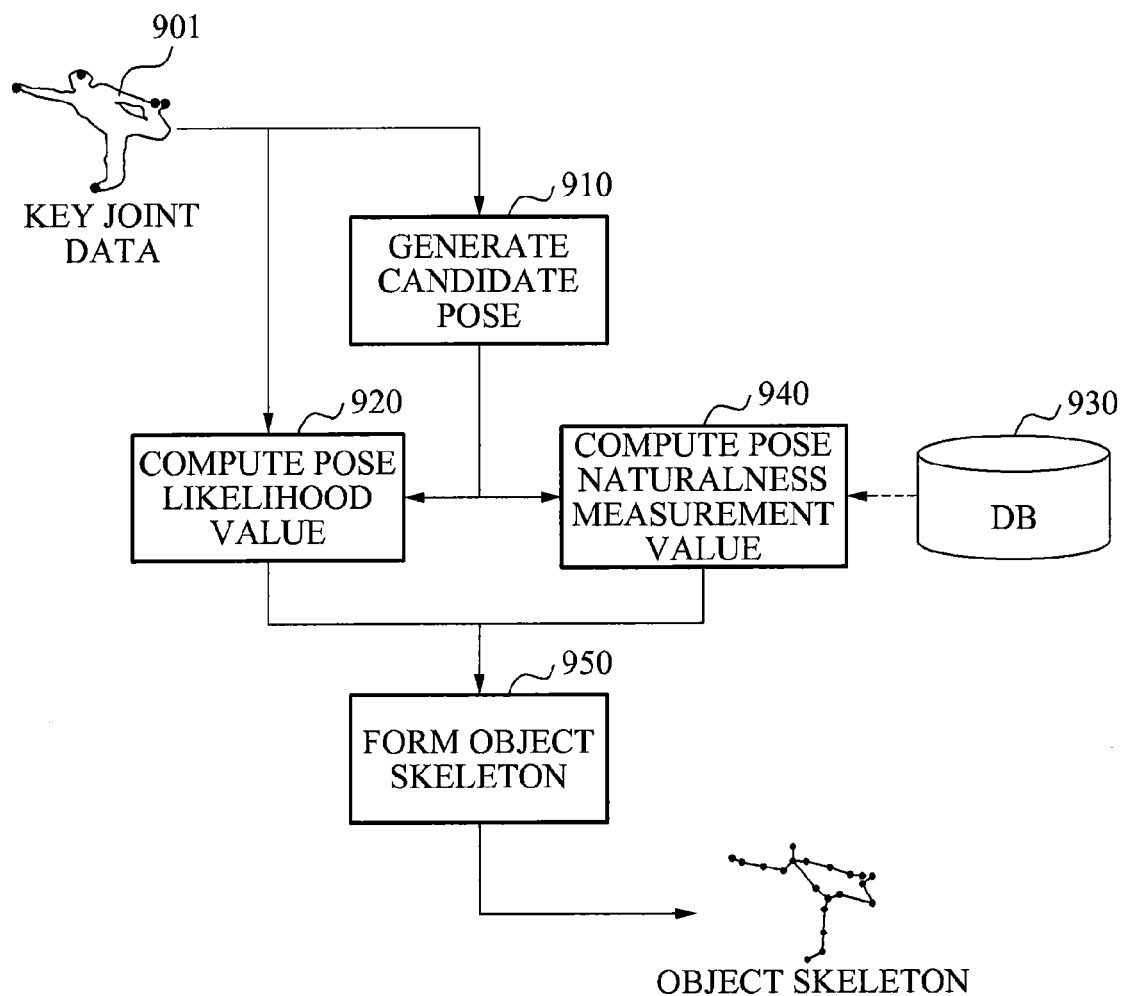
FIG. 9 illustrates operations, as only examples, of a pose retriever, e.g., available for use in the object pose detection apparatus of FIG. 1, according to one or more embodiments.

FIG. 9 illustrates method operations for retrieving a pose based on key joint data, such as by the pose retriever 130 of FIG. 1, according to one or more embodiments. As only an example, referring to FIG. 9, in operation 910, the pose retriever 130 may generate one or more candidate poses for an object 901 based on identified key joint data of the object 901. Depending on embodiment, the pose retriever 130 may generate at least two candidate poses.

The pose retriever 130 may retrieve a most likely pose from generated candidate poses. In an embodiment, the pose retriever 130 may retrieve the most likely pose by calculating a pose naturalness measurement value for each of the generated candidate poses. In this or another embodiment, the pose retriever 130 may retrieve the most likely pose by calculating a pose likelihood value for each of the generated candidate poses. In these or still another embodiment, the pose retriever 130 may calculate a pose naturalness measurement value and a pose likelihood value of each of the generated candidate poses, and may retrieve the most likely pose based on the calculated values. An operation by which the pose retriever 130, as only an example, calculates a pose likelihood value and retrieves the most likely pose will be further described below with reference to operation 920. Additionally, an operation by which the pose retriever 130, again as only an example, calculates a pose naturalness measurement value and retrieves the most likely pose will be further described with reference to operation 930.

When a plurality of candidate poses are generated, the pose retriever 130 may obtain a weighted sum of the plurality of candidate poses, and may retrieve the most likely pose based on the weighted sum. Specifically, the most likely pose may be retrieved by obtaining the weighted sum, using: (1) a scheme where a most likely candidate pose is selected based upon which candidate pose has a respective calculated weighting factor equal to or greater than a threshold from among the plurality of candidate poses, and then obtaining a weighted sum of the selected candidate pose; and (2) a scheme of calculating a difference between a reference value and each of the plurality of candidate poses, and then obtaining a weighted sum of the calculated difference.

In operation 920, a pose likelihood value of the generated candidate pose may be calculated. Depending on embodiment, the pose retriever 130 may retrieve, as the most likely pose, the candidate pose that has highest pose likelihood value or whose likelihood value meets a predetermined likelihood threshold. The pose retriever 130 may calculate a pose likelihood value based on the below Equation 1, for example.

$$L = \exp(-\|C-D\|^2) \qquad \text{Equation 1}$$

In Equation 1, C denotes a set of joint positions of generated candidate poses, D denotes a set of depth values of joint positions of candidate poses in an input image, and L denotes a pose likelihood value.

Referring to Equation 1, as a difference between the sets C and D decreases, the pose likelihood value L may become closer to "1." Additionally, as the difference between the sets C and D increases, the pose likelihood value L may become closer to "0."

In operation 940, a pose naturalness measurement value may be calculated for the generated candidate pose, based on a database 930, for example. Depending on embodiment, the database 930 may be identical to the database 120 of FIG. 1, or database 930 may be a separate and distinct database. For the pose naturalness measurement value, the pose retriever 130 may calculate a probability value for each candidate pose C, using the database 930, such that the calculated probability value can be considered the pose naturalness measurement value. The database 930 used to calculate a probability value of a candidate pose may store a learned statistical model, and may also store statistical models of at least several tens to several hundreds of pose groups by collecting statistical models of a predetermined pose group.

As only an example, a statistical model stored in the database 930 may include, for example, a factor analyzer, and may be modeled as shown in the below Equation 2, for example.

$$q = Ls + n \qquad \text{Equation 2}$$

In Equation 2, q denotes a vector of D-dimensions with an actual joint value of a pose.

Additionally, L denotes a vector of 'D×d' dimensions that stores a representative pose in a predetermined pose group. For example, when ten representative poses exist in a predetermined pose group, and when 60 actual joint values are included in each of the ten representative poses, D may have a value of "60" and d may have a value of "10."

Furthermore, s, as a hidden factor of a factor analyzer, denotes a vector of d-dimensions that is determined by learning, and may be assumed as zero-mean Gaussian distribution N(0, I).

Moreover, n denotes noise as a Gaussian Random Variable, and may be assumed as Gaussian Distribution N($\mu$, $\psi$).

When a Gaussian distribution model is applied to Equation 2, the example below Equation 3 may be obtained.

$$p(q) = N(q|\mu, LL^T + \psi) \qquad \text{Equation 3}$$

In Equation 3, p(q) denotes a probability value of a pose (namely, a pose naturalness measurement value), and q denotes a vector of D-dimensions with an actual joint value of a pose. Additionally, L denotes a vector of 'D×d' dimensions that stores a representative pose in a pose group, $\mu$ denotes a mean vector of a modeled n, and $\psi$ denotes a variance matrix of the modeled n.

In another example, when it is difficult to represent a pose of an object with non-linear distribution, using the factor analyzer, Mixture of Factor Analyzers (MFAs) may be used as shown below in Equation 4, for example. In an embodiment, the MFA may be a model configured with a weighted sum of several linear models.

$$p(q) = \sum_{k=1}^{K} w_k N(q \mid \mu_k, L_k L_k^T + \psi)$$ Equation 4

In Equation 4, K denotes a number of factor analyzers, and $w_k$ denotes a weighting factor of a predetermined pose group k. Additionally, q denotes a vector of D-dimensions with an actual joint value of a pose, and $L_k$ denotes a vector of 'D×d' dimensions that stores a representative pose in the predetermined pose group k. Furthermore, $\mu_k$ denotes a mean vector of a modeled n of the predetermined pose group k, and $\psi$ denotes a variance matrix of the modeled n.

As described above, the statistical models stored in the database 930 may be learned. In an example of MFA statistical models, all pose information may be input, and $L_k$, s, $W_k$, $\mu_k$, $\psi$, and the like may be learned by an expectation maximization method, and the learned result may be updated in the database 930.

In an example, when a database storing an MFA statistical model is used, each candidate pose C may be input as q in Equation 4, for example, and a probability value p(C) (namely, a pose naturalness measurement value) associated with the candidate pose C may be derived. Depending on embodiment, the pose retriever 130 may retrieve, as the most likely pose, a candidate pose C with a highest probability value (namely, a highest pose naturalness measurement value), as only an example.

In this or another embodiment, the pose retriever 130 may calculate a pose likelihood value of a candidate pose, may calculate a pose naturalness measurement value of the candidate pose based on the database 930, and may collectively determine the calculated pose likelihood value and the calculated pose naturalness measurement value, to retrieve the most likely pose. To collectively determine the pose likelihood value and the pose naturalness measurement value, the pose retriever 130 may use a scheme of retrieving, as the most likely pose, a candidate pose with a highest average of the two values, and a scheme of calculating the two values by assigning different weighting factors to the two values and of retrieving, as the most likely pose, a candidate pose with a highest value among the calculated values. In addition to the above schemes, the pose retriever 130 may perform various schemes to collectively determine the pose likelihood value and the pose naturalness measurement value and to retrieve the most likely pose.

In operation 950, an object skeleton may then be formed based on the retrieved most likely pose. The object skeleton may be obtained by representing a shape of the object 901 in the form of a skeleton, for example. Accordingly, it is possible to effectively control a pose and an operation of an object.

Figure 10:
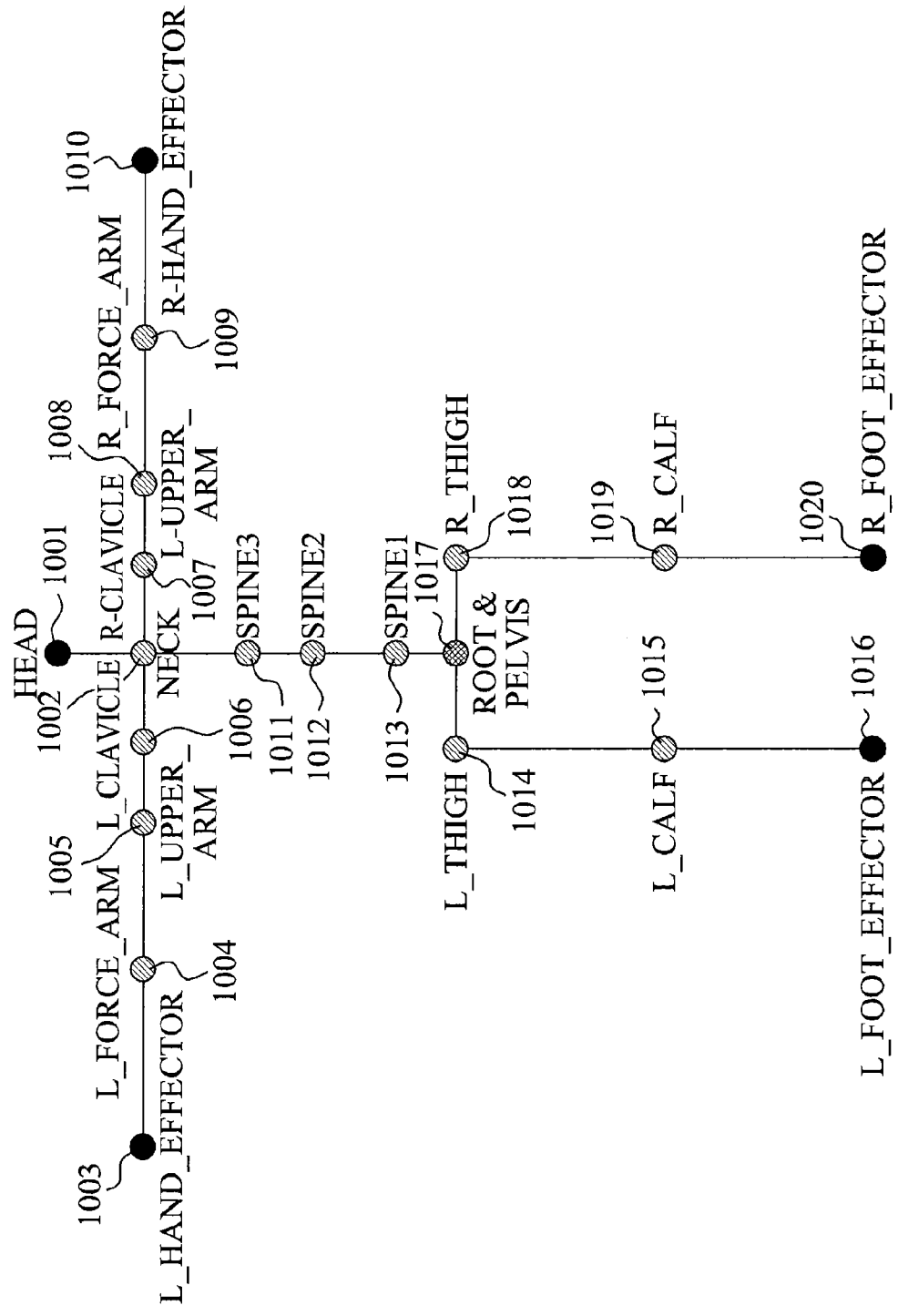
FIGS. 10 and 11 illustrate object skeletons, according to one or more embodiments.
Figure 11:
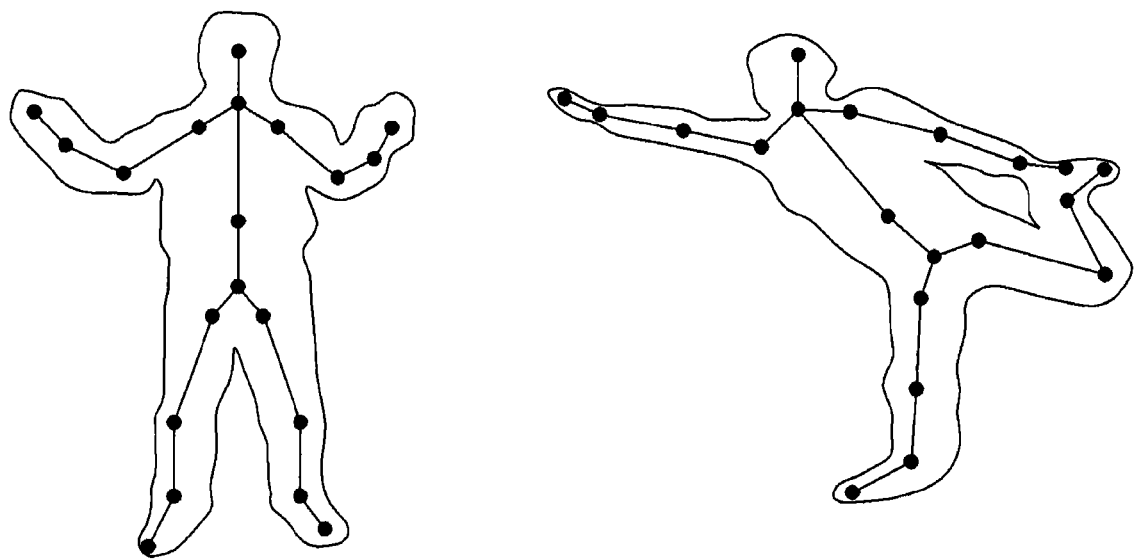

Hereinafter, an object skeleton according to one or more embodiments will be described in greater detail with reference to FIGS. 10 and 11. Referring to FIGS. 10 and 11, a pose retriever, such as the pose retriever 130 of FIG. 1, may calculate an object skeleton including a plurality of joints 1001 through 1020.

Specifically, the object skeleton of FIG. 10 may include the plurality of joints 1001 through 1020, for example a head 1001, a neck 1002, an L_hand_effector 1003, an L_force_arm 1004, an L_upper_arm 1005, an L_clavicle 1006, an R_clavicle 1007, an R_upper_arm 1008, an R_force_arm 1009, an R_hand_effector 1010, a spine 3 1011, a spine 2 1012, a spine 1 1013, an L_thigh 1014, an L_calf 1015, an L_foot_effector 1016, a root & pelvis 1017, an R_thigh 1018, an R_calf 1019, and an R_foot_effector 1020. Here, as the plurality of joints 1001-1020 have been titled as if corresponding to different body parts, an alternative understanding of the illustrated plurality of joints 1001-1020 may be for differentiating of plural identified body components. Further, these identified plurality of joints should only be considered to be examples, and not requiring all or limiting the number of identifiable joints, body components, or degrees of freedom (DOF). Still further, as a plurality of joints, each of joints 1001-1020 may have one or more predetermined DOFs.

Referring to FIG. 11, the pose retriever 130 may thereby output to a display of the object pose detection apparatus of FIG. 1, for example, an image obtained by combining an object skeleton with an object shape, according to one or more embodiments.

Figure 12:
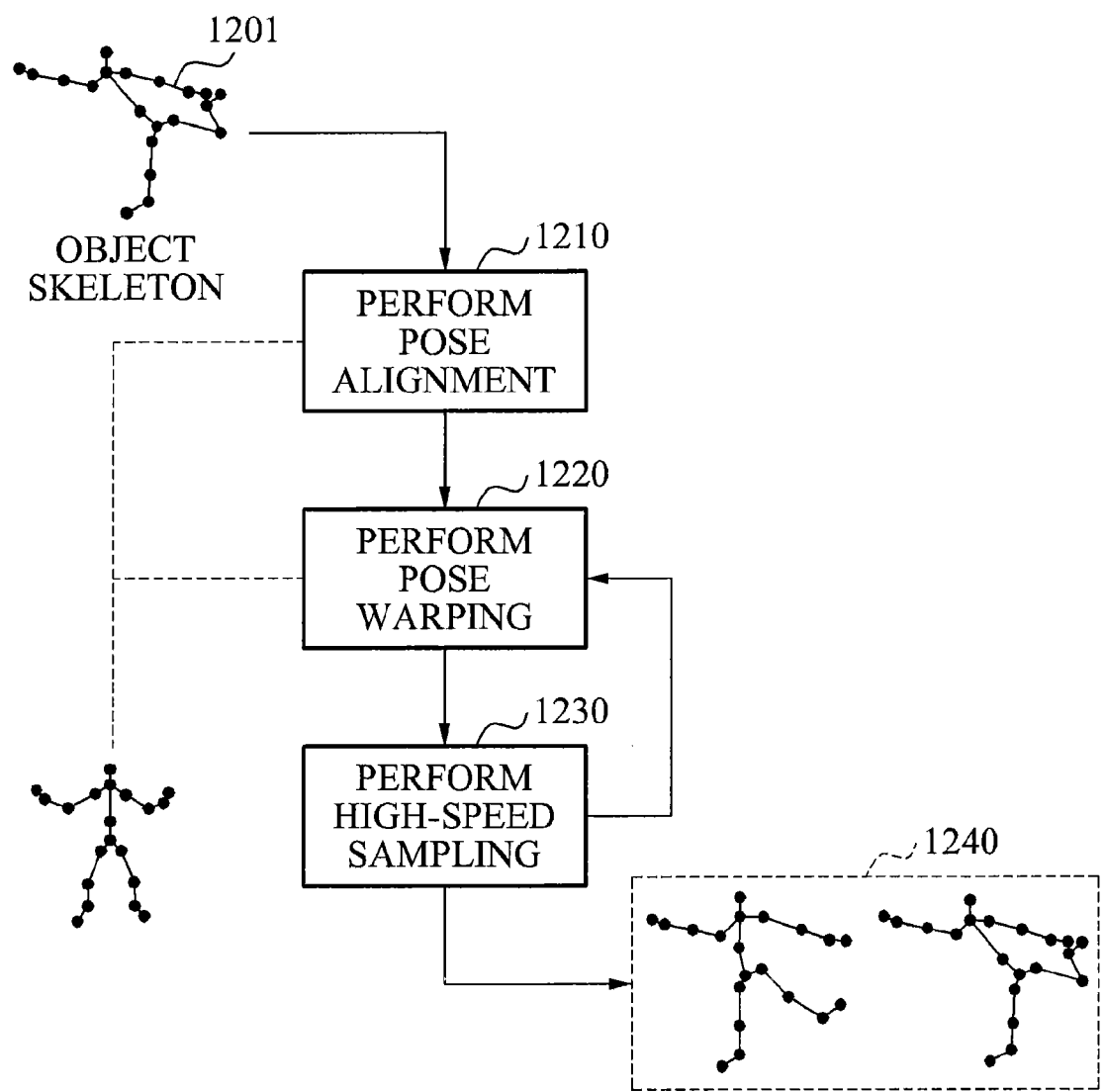
FIG. 12 illustrates operations, as only examples, of a post-processing element, e.g., available for use in the object pose detection apparatus of FIG. 1, according to one or more embodiments.

FIG. 12 illustrates a diagram of operations, as only examples, of a post-processing element, such as the post-processing element 150 of FIG. 1, according to one or more embodiments. Referring to FIG. 12, operation 1210 may be performed by the post-processing element 150 to perform pose alignment on an object skeleton 1201 with a most likely pose having been retrieved by the pose retriever 130, for example. Operations 1220 and 1230 will be described in greater detail below, but may also be performed by the post-processing element 150. In operation 1210, a root position and a direction between a current pose and a previous pose of the object skeleton 1201 may be aligned.

In operation 1220, pose warping may be performed to generate an intermediary pose by interpolating between the current pose and the previous pose that are aligned. In an embodiment, the post-processing element 150 may perform pose warping, based on a pose of a previous frame using temporal information, and based on various poses generated using spatial information in a current frame. In this or another embodiment, the post-processing element 150 may further blend a final object skeleton, based on a determined confidence value of an object skeleton that may be finally estimated from the previous frame and a determined confidence value of an object skeleton that may be finally estimated from the current frame. As a result of the blending, the post-processing element 150 may interpolate a pose that is more similar to a pose of the corresponding object, and may quickly estimate the pose of the object.

In operation 1230, a smooth and natural transition may be provided, through linear interpolation and non-linear interpolation, between the current pose and the previous pose that are warped, and high-speed sampling may then be performed on intermediary poses between skeletons that are sensed and recognized. Accordingly, the object pose detection apparatus of FIG. 1 may output poses of a corresponding object at higher speeds than the original images' captured speed.

In one or more embodiments, the post-processing element 150 may calculate a momentum for an object. The calculated momentum may be used to calculate, for example, calorie consumption and energy consumption of a user, and the like, as only examples. The post-processing element 150 may calculate, as a momentum for an object, a sum of distances between a plurality of most likely poses retrieved for each of a plurality of frames of a depth image of the object. Depending on embodiment, the post-processing element 150 may calculate each distance between key joints at the same position among a plurality of key joints of a current frame and a plurality of key joints of a previous frame, may sum up distances that are equal to or greater than a threshold among the calculated distances, to calculate the momentum. As only an example, the post-processing element 150 may calculate the momentum for the object, using the below Equations 5 and 6.

$$E = \sum_{frame=1}^{m} \sum_{joint=1}^{n} I(x)$$ Equation 5

$$I(x) = \begin{cases} 1, & \text{if } \|P_x - C_x\| < D \\ 0, & \text{otherwise} \end{cases}$$ Equation 6

In Equation 5, E denotes a finally estimated momentum that may be calculated by accumulating all input frames m corresponding to all joints n. In Equation 6, D denotes a distance threshold. Additionally, I(x) denotes a recall function used to determine whether an object is moved, and may return 1 when the object is moved by at least D. $P_x$ denotes a skeleton of a previous frame, and $C_x$ denotes a skeleton of a current frame.

FIG. 13 illustrates a diagram of operations, as only examples, of a model-based tracker, such as the model based tracker 160 of FIG. 1, according to one or more embodiments. Referring to FIG. 13, operation 1310 may be performed by the model-based tracker 160 to calculate a difference between a current depth image of an object 1301 and a previous depth image of an object 1302, which may have been stored. As only an example, the below described operations 1320 through 1340 may be performed by the model-based tracker 160.

In operation 1320, a fitting onto the illustrated 3D model 1321 may be performed using the calculated difference. Additionally, in operation 1330, the current depth image of the object 1301 may be stored in a database, e.g., as a previous image. In operation 1340, an object pose associated with the object 1301 may thereby be calculated. Accordingly, an object skeleton 1350 may be estimated based on the calculated object pose. The object pose detection apparatus of FIG. 1 may additionally perform the above-described operations 1310 through 1340, and thus it is possible to increase the efficiency of retrieving the most likely pose of an object.

Depending on embodiment, the post-processing element 150 may compare the object skeleton 1350 estimated by the model-based tracker 160 with the most likely pose retrieved by the pose retriever 130, and may assign a weighting factor to an object skeleton with a high estimation accuracy. Accordingly, the post-processing element 150 may blend the object skeleton 1350 with the most likely pose retrieved by the pose retriever 130 to form a single object skeleton. Additionally, the post-processing element 150 may assign a weighting factor, and may select a pose to which the weighting factor is applied from between the object skeleton 1350 and the most likely pose retrieved by the pose retriever 130, so that the selected pose may be output as a finally estimated object skeleton.

Figure 14:
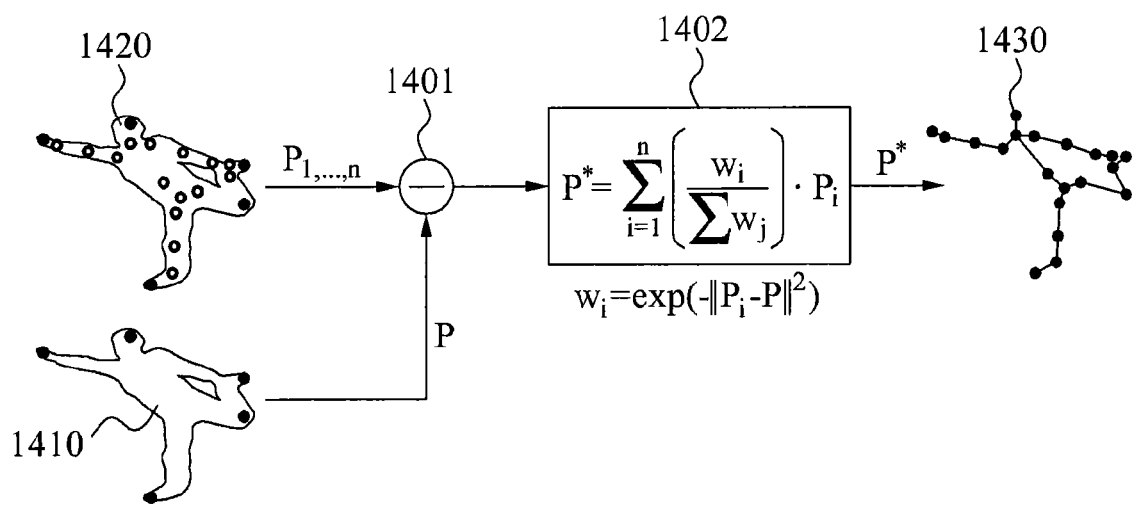
FIG. 14 illustrates an operation, as only an example, by which a pose retriever, e.g., available for use in the object pose detection apparatus of FIG. 1, is configured to retrieve a most likely pose using a weighting factor, according to one or more embodiments.

FIG. 14 illustrates a diagram of an operation, as only an example, by which a pose retriever, such as the pose retriever 130 of FIG. 1, retrieves a most likely pose using a weighting factor, according to one or more embodiments. Referring to FIG. 14, operation 1401 may be performed to calculate a difference between a pose 1410 to which key joint data is applied and a candidate pose 1420. As only an example, operation 1401 may be performed by the pose retriever 130. In an embodiment, at least two candidate poses 1420 may be generated.

Additionally, the pose retriever 130 may calculate a weighting factor $w_i$ of the candidate pose 1420, based on the calculated difference. Depending on embodiment, the pose retriever 130 may calculate a weighting factor using the below Equation 7, for example.

$$w_i = \exp(-\|P_i - P\|^2)$$ Equation 7

In Equation 7, P denotes the pose 1410 to which key joint data is applied, and $P_i$ denotes the candidate pose 1420.

In operation 1402, a weighted sum of the candidate pose 1420 may be obtained based on the calculated weighting factor. Similarly, in an embodiment, operation 1402 may also be performed by the pose retriever 130. Depending on embodiment, the pose retriever 130 may thereafter calculate a pose 1430 generated by summing up weighting factors using the below Equation 8, for example.

$$P^* = \sum_{i=1}^{n} \left(\frac{w_i}{\sum w_j}\right) \cdot P_i$$ Equation 8

In Equation 8, $P_i$ denotes the candidate pose 1420, and P* denotes the pose 1430 generated by summing up the weighting factors.

The pose retriever 130 may retrieve the pose 1430 as the most likely pose.

Figure 15:
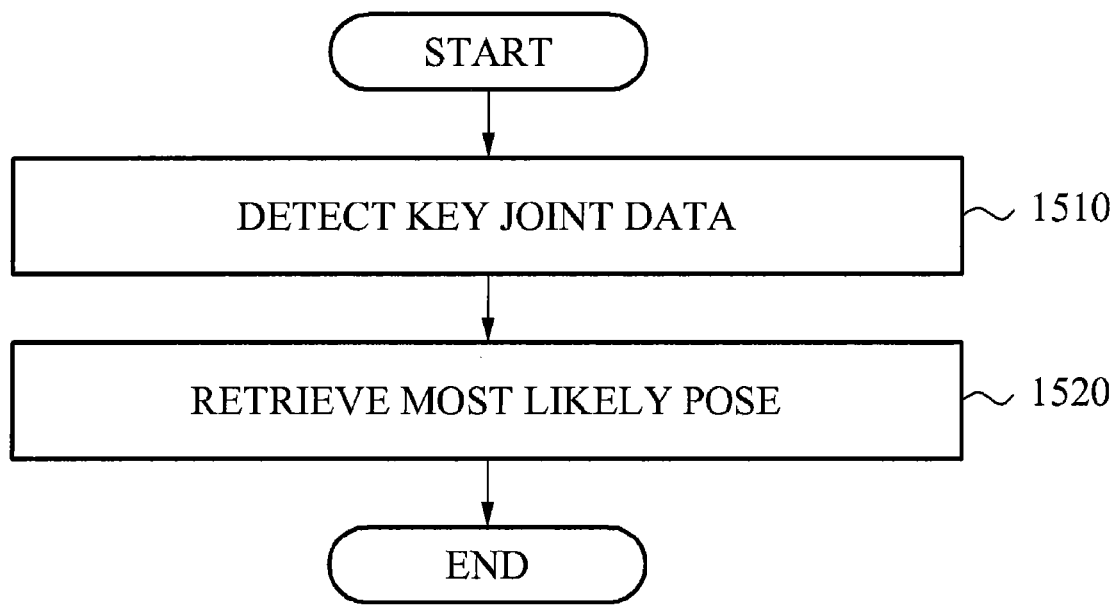
FIG. 15 illustrates an object pose detection method, according to one or more embodiments.

FIG. 15 illustrates a flowchart of an object pose detection method, according to one or more embodiments.

Referring to FIG. 15, in operation 1510, key joint data of an object may be detected from a depth image of the object. The object may represent a person, an inanimate object, and the like that are included in a pre-recorded image or a real-time image that is input in real time from a camera. Key joints may include, for example, plural extremity parts and potentially one or more connection parts of an object, and the like.

In operation 1520, a most likely pose with a highest similarity to the object may be retrieved based on the key joint data, using a database. The database may store an object pose associated with the object, and the object pose may include information regarding a pose that may be generally used by the object.

The most likely pose may be retrieved using various schemes. For example, at least one candidate pose may be generated, and the most likely pose may be retrieved using the generated at least one candidate pose.

To generate at least one candidate pose for the object, a scheme of applying a constraint IK to the key joint data, and a scheme of statistically extracting at least one candidate pose for the object from the database based on the key joint data may be used. Additionally, in an embodiment, a pose with a highest similarity to generated candidate poses may be retrieved as the most likely pose from the database. In this or another embodiment, the most likely pose may be retrieved from the generated candidate poses, using weighting factors.

Operational aspects of the above-described embodiments of the object pose detection apparatus may similarly be applied to the object pose detection method of FIG. 15, and accordingly, further description of the object pose detection method will be omitted.

Figure 16A:
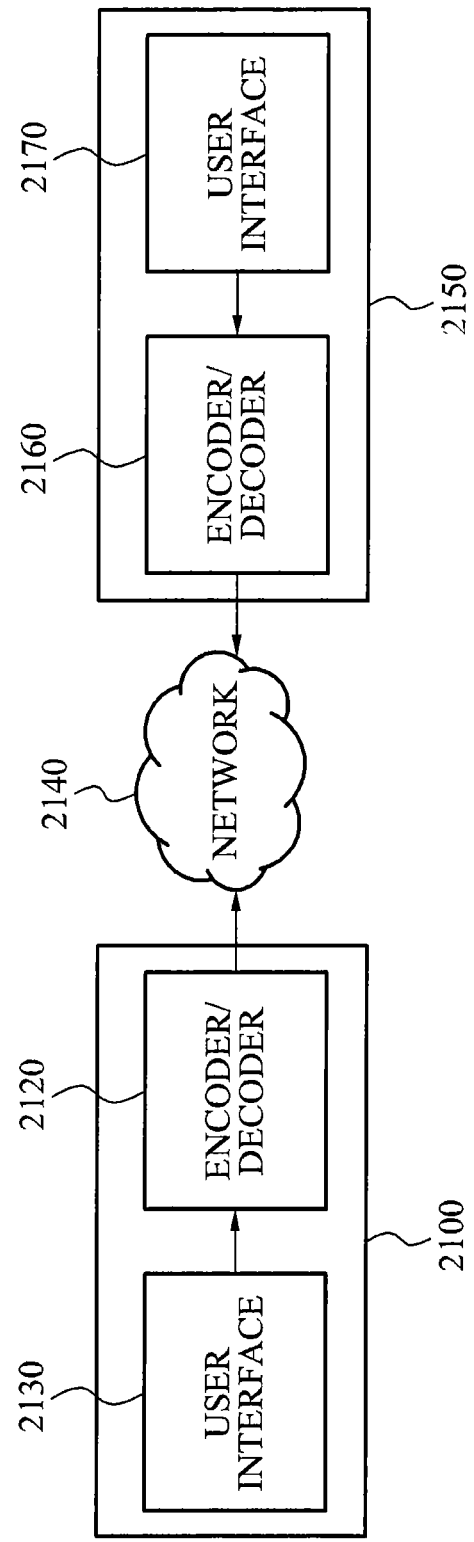
FIGS. 16A and 16B illustrate one or more object pose detection apparatuses configured to include a processing device, and potentially a user interface, configurable for communicating with respective other processing devices, and potentially other user interfaces, for example, according to one or more embodiments.
Figure 16B:
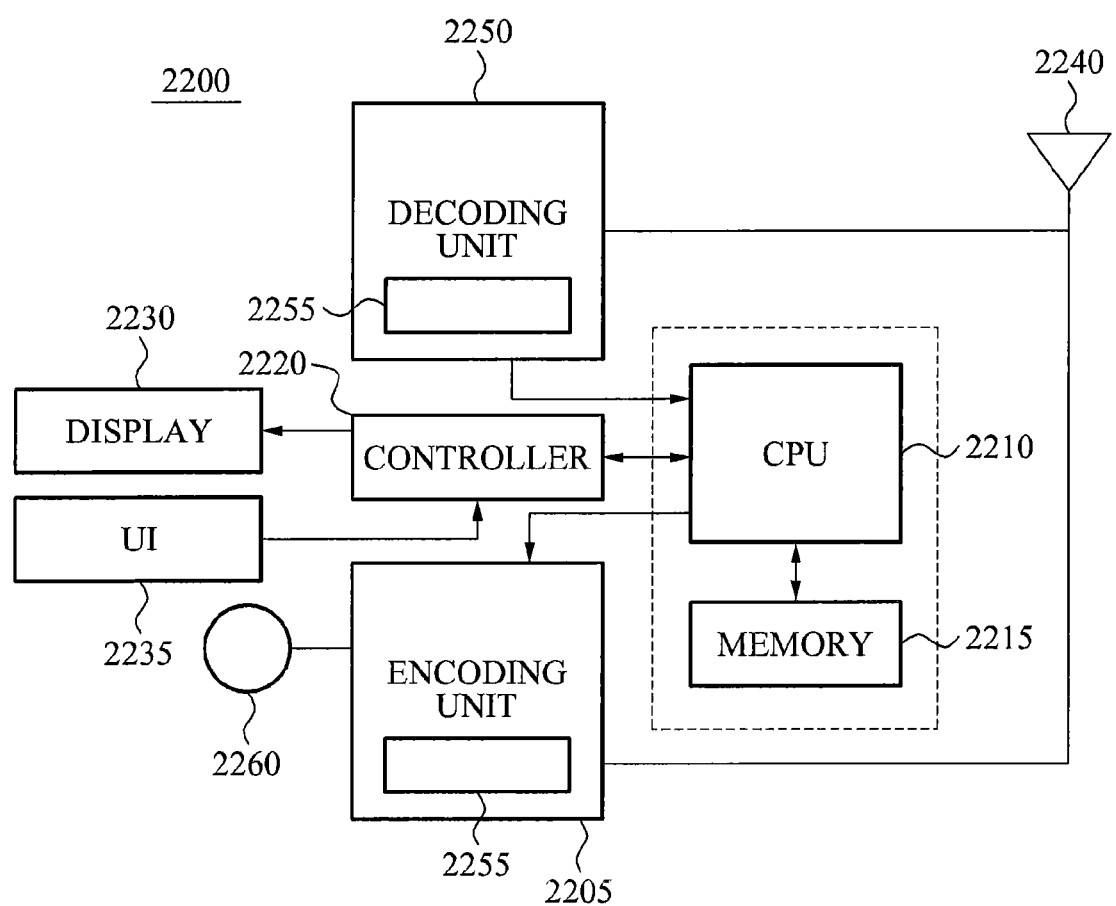

FIGS. 16A and 16B illustrate one or more embodiments of one or more object pose detection apparatuses respectively configured to include a processing device, and potentially respective user interfaces, that may be capable of communicating through one or more networks with respective other processing devices, and potentially other user interfaces, for example.

FIG. 16A illustrates an object pose detection apparatus 2100, one or more networks 2140, and potentially another object pose detection apparatus 2150. The object pose detection apparatus 2100 may include a processing device or system, and potentially a user interface 2130, and the object pose detection apparatus 2150 may similarly include a processing device or system 2160, and potentially user interface 2170.

FIG. 16B illustrates a terminal 2200, which is representative for one or both of the object pose detection apparatus 2100 and the object pose detection apparatus 2150 of FIG. 16A, according to one or more embodiments. The terminal 2200 may include anencoder2205 coupled to a image input device 2260, such as one or more cameras, for example, a decoder2250, the user interface 2130, e.g., a display 2230 and potentially input/output interface 2235, and one or more processing device, such as central processing unit (CPU) 2210. The CPU 2210 may be coupled to the encoder2205 and the decoder2250, and may control the operations of the encoder 2205 and the decoder 2250, as well as the interactions of other components of the terminal 2200 with the encoder 2205 and decoder 2250. Additionally, in addition or as an alternative, the image input device 2260 may be connected to the CPU 2210 directly. Further, the display 2230 may display an estimated pose of an object, as estimated according to one or more embodiments. The illustrated element 2240 represent one or more wireless and/or wired communication systems. In an embodiment, and only as an example, the terminal 2200 may be a desktop computer, a laptop computer, a set-top device, e.g., as an home entertainment or gaming terminal, a mobile device, such as a mobile phone, smart phone, tablet computer, personal digital assistant, or the laptop computer, and the CPU 2210 may implement other features of the terminal and capabilities of the terminal for customary features in mobile phones, smart phones, tablets computers, or personal digital assistants, as only examples, with such an embedded estimated pose reliant environment based upon one or more embodiments described herein. Accordingly, one or more embodiments may include the entirety of the terminal 2200, with differing aspects and features, with embedded pose estimation that may be available for differing applications and functions, either for interacting with other embedded features or with remote devices or applications.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their. equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus, the apparatus comprising:
  a key joint detector configured to analyze an image to detect key joint data regarding respective plural key joints of an object in the image;
  a database configured to store respective information of plural object poses representing potential poses of one or more objects; and
  a pose retriever configured to generate at least one candidate pose for the object based on the detected key joint data, to calculate a pose likelihood value of the at least one candidate pose based on the key joint data, to calculate a pose naturalness measurement value of the at least one candidate pose based on a pose database, and to retrieve a most likely pose based on the pose likelihood measurement value and the pose naturalness measurement value.

2. The apparatus of claim 1, wherein the image is a depth image of the object.

3. The apparatus of claim 1, wherein the pose retriever is configured to calculate an object skeleton associated with the object based on the most likely pose.

4. The apparatus of claim 1, further comprising:
a camera configured to capture the image as an image of a user posing in front of the camera.

5. An apparatus, the apparatus comprising:
a key joint detector configured to analyze an image to detect key joint data regarding respective plural key joints of an object in the image; and
a pose retriever configured to retrieve and output from a database a most likely pose, of plural object poses, based on the detected key joint data,
wherein the database is configured to store respective information of the plural object poses representing potential poses of one or more objects; and
wherein the key joint detector is configured to search the object for an end point, extract a feature of the end point from the image, classify the end point based on the extracted feature, and calculate a position of the classified end point to detect respective key joint data.

6. The apparatus of claim 5, wherein the key joint detector is configured to segment an image showing an extremity part corresponding to the end point from the image, normalize the segmented image, extract a feature of the extremity part from the normalized image, classify the extremity part based on the extracted feature, and calculate a position of the classified extremity part to detect the respective key joint data.

7. The apparatus of claim 6, wherein the key joint detector is further configured to extract a feature of the object from the image, classify a pose of the object as being a particular pose based on the extracted feature, and detect the key joint data from the database based on the classified pose.

8. The apparatus of claim 7, wherein the key joint detector is configured to extract a three-dimensional (3D) silhouette feature of the object from the image, classify the pose of the object based on the extracted 3D silhouette feature as corresponding to a particular pose class identification (ID), and detect the key joint data from the database based on the pose class ID.

9. The apparatus of claim 7, wherein the key joint detector is configured to extract a 3D level set feature of the object from the image, classify the pose of the object based on the extracted 3D level set feature as corresponding to a particular pose class identification (ID), and detect the key joint data from the database based on the pose class ID.

10. The apparatus of claim 7, wherein the pose retriever is configured to generate at least one candidate pose for the object by applying a constraint Inverse Kinematics (IK) to the key joint data.

11. The apparatus of claim 10, wherein the pose retriever is configured to calculate a difference between a pose to which the key joint data is applied and the at least one candidate pose, calculate a weighting factor of the at least one candidate pose based on the calculated difference, obtain a weighted sum of the at least one candidate pose based on the calculated weighting factor, and retrieve a pose generated by the weighted sum as the most likely pose.

12. The apparatus of claim 7, further comprising:
a post-processing element configured to calculate a momentum of the object;
wherein the post-processing element is configured to calculate, as the momentum, a sum of distances between a plurality of determined most likely poses respectively retrieved for each of a plurality of frames of the image.

13. The apparatus of claim 12, wherein the post-processing element is configured to calculate each distance between key joints in a same position among a plurality of key joints of a current frame and a plurality of key joints of a previous frame, and sum up distances that are equal to or greater than a threshold among the calculated distances to calculate the momentum.

14. The apparatus of claim 7, further comprising:
a display configured to display a calculated object skeleton associated with the object based on the most likely pose.

15. The apparatus of claim 5, further comprising:
a display configured to display a calculated object skeleton associated with the object based on the most likely pose.

16. The apparatus of claim 5, wherein the pose retriever is configured to generate at least one candidate pose for the object by applying a constraint Inverse Kinematics (IK) to the key joint data.

17. The apparatus of claim 16, wherein the pose retriever is configured to calculate a difference between a pose to which the key joint data is applied and the at least one candidate pose, calculate a weighting factor of the at least one candidate pose based on the calculated difference, obtain a weighted sum of the at least one candidate pose based on the calculated weighting factor, and retrieve a pose generated by the weighted sum as the most likely pose.

18. The apparatus of claim 5, further comprising:
a post-processing element configured to calculate a momentum of the object;
wherein the post-processing element is configured to calculate, as the momentum, a sum of distances between a plurality of determined most likely poses respectively retrieved for each of a plurality of frames of the image.

19. The apparatus of claim 18, wherein the post-processing element is configured to calculate each distance between key joints in a same position among a plurality of key joints of a current frame and a plurality of key joints of a previous frame, and sum up distances that are equal to or greater than a threshold among the calculated distances to calculate the momentum.

20. An apparatus, the apparatus comprising:
a key joint detector configured to analyze an image to detect key joint data regarding respective plural key joints of an object in the image; and
a pose retriever configured to retrieve and output from a database a most likely pose, of plural object poses, based on the detected key joint data,
wherein the database is configured to store respective information of the plural object poses representing potential poses of one or more objects; and
wherein the key joint detector further is configured to extract a feature of the object from the image, classify a pose of the object as being a particular pose based on the extracted feature, and detect the key joint data from the database based on the classified pose.

21. The apparatus of claim 20, wherein the key joint detector is configured to extract a three-dimensional (3D) silhouette feature of the object from the image, classify the pose of the object based on the extracted 3D silhouette feature as corresponding to a particular pose class identification (ID), and detect the key joint data from the database based on the pose class ID.

22. The apparatus of claim 20, wherein the key joint detector is configured to extract a 3D level set feature of the object from the image, classify the pose of the object based on the extracted 3D level set feature as corresponding to a particular pose class identification (ID), and detect the key joint data from the database based on the pose class ID.

23. An apparatus, the apparatus comprising:
a key joint detector configured to analyze an image to detect key joint data regarding respective plural key joints of an object in the image;
a database configured to store respective information of plural object poses representing potential poses of one or more objects; and
a pose retriever configured to retrieve and output from the database a most likely pose, of the plural object poses, based on the detected key joint data, with the most likely pose having a determined highest similarity to an actual pose of the object;
wherein the pose retriever is configured to generate at least one candidate pose for the object by applying a constraint Inverse Kinematics (IK) to the key joint data; and
wherein the pose retriever is configured to calculate a difference between a pose to which the key joint data is applied and the at least one candidate pose, calculate a weighting factor of the at least one candidate pose based on the calculated difference, obtain a weighted sum of the at least one candidate pose based on the calculated weighting factor, and retrieve a pose generated by the weighted sum as the most likely pose.

24. An apparatus, the apparatus comprising:
a key joint detector configured to analyze an image to detect key joint data regarding respective plural key joints of an object in the image; and
a pose retriever configured to retrieve and output from a database a most likely pose, of plural object poses, based on the detected key joint data,
wherein the database is configured to store respective information of the plural object poses representing potential poses of one or more objects; and
wherein the pose retriever is configured to generate at least one candidate pose for the object based on the detected key joint data, to calculate a pose naturalness measurement value of the at least one candidate pose, based on the database, and to retrieve a candidate pose having a highest naturalness measurement value as the most likely pose.

25. An apparatus, the apparatus comprising:
a key joint detector configured to analyze an image to detect key joint data regarding respective plural key joints of an object in the image;
a database configured to store respective information of plural object poses representing potential poses of one or more objects; and
a pose retriever configured to retrieve and output from the database a most likely pose, of the plural object poses, based on the detected key joint data, with the most likely pose having a determined highest similarity to an actual pose of the object;
a post-processing element to calculate a momentum for the object,
wherein the post-processing element is configured to calculate, as the momentum, a sum of distances between a plurality of determined most likely poses respectively retrieved for each of a plurality of frames of the image.

26. The apparatus of claim 25, wherein the post-processing element is configured to calculate each distance between key joints in a same position among a plurality of key joints of a current frame and a plurality of key joints of a previous frame, and to sum up distances that are equal to or greater than a threshold among the calculated distances to calculate the momentum.

27. A method, the method comprising:
analyzing an image to detect key joint data regarding respective plural key joints of an object in the image; and
retrieving and outputting from a database, storing respective information of plural object poses representing potential poses of one or more objects, a most likely pose, of the plural object poses, based on the detected key joint data,
wherein the most likely pose is a pose with a determined highest similarity to an actual pose of the object; and
wherein the retrieving further comprises:
generating at least one candidate pose for the object based on the detected key joint data;
calculating a pose naturalness measurement value of the at least one candidate pose, based on the database; and
retrieving a candidate pose having a highest naturalness measurement value as the most likely pose.

28. The method of claim 27, wherein the image is a depth image of the object.

29. A non-transitory computer readable recording medium comprising computer readable code to control at least one processing device to implement the method of claim 27.

30. A method, the method comprising:
analyzing an image to detect key joint data regarding respective plural key joints of an object in the image; and
retrieving and outputting from a database, storing respective information of plural object poses representing potential poses of one or more objects, a most likely pose, of the plural object poses, based on the detected key joint data;
wherein the most likely pose is a pose with a determined highest similarity to an actual pose of the object; and
wherein the analyzing of the image includes searching the object for an end point, extracting a feature of the end point from the image, classifying the end point based on the extracted feature, and calculating a position of the classified end point to detect respective key joint data.

31. The method of claim 30, wherein the analyzing of the image includes:
segmenting an image showing an extremity part corresponding to the end point from the image, normalizing the segmented image;
extracting a feature of the extremity part from the normalized image;
classifying the extremity part based on the extracted feature; and
calculating a position of the classified extremity part to detect the respective key joint data.

32. The method of claim 31, wherein the analyzing of the image includes:
extracting a feature of the object from the image;
classifying a pose of the object as being a particular pose based on the extracted feature; and
detecting the key joint data from the database based on the classified pose.

33. The method of claim 32, wherein the analyzing of the image includes:
extracting a three-dimensional (3D) silhouette feature of the object from the image;
classifying the pose of the object based on the extracted 3D silhouette feature as corresponding to a particular pose class identification (ID); and
detecting the key joint data from the database based on the pose class ID.

34. The method of claim 32, wherein the analyzing of the image includes:
extracting a 3D level set feature of the object from the image;

classifying the pose of the object based on the extracted 3D level set feature as corresponding to a particular pose class identification (ID); and detecting the key joint data from the database based on the pose class ID.

35. The method of claim 32, wherein the retrieving further comprises:

generating at least one candidate pose for the object by applying a constraint Inverse Kinematics (IK) to the key joint data.

36. The method of claim 35, wherein the retrieving further comprises:

calculating a difference between a pose to which the key joint data is applied and the at least one candidate pose;

calculating a weighting factor of the at least one candidate pose based on the calculated difference;

obtaining a weighted sum of the at least one candidate pose based on the calculated weighting factor; and retrieving a pose generated by the weighted sum as the most likely pose.

37. The method of claim 32, further comprising:

calculating a momentum of the object based on a sum of distances between a plurality of determined most likely poses respectively retrieved for each of a plurality of frames of the image.

38. The method of claim 37, wherein calculating of the momentum further comprises:

calculating each distance between key joints in a same position among a plurality of key joints of a current frame and a plurality of key joints of a previous frame; and summing up distances that are equal to or greater than a threshold among the calculated distances to calculate the momentum.

39. The method of claim 32, further comprising:

calculating an object skeleton associated with the object based on the most likely pose and displaying to object skeleton on a display.

40. The method of claim 30, further comprising:

calculating an object skeleton associated with the object based on the most likely pose and displaying to object skeleton on a display.

41. The method of claim 30, wherein the retrieving further comprises:

generating at least one candidate pose for the object by applying a constraint Inverse Kinematics (IK) to the key joint data.

42. The method of claim 41, wherein the retrieving further comprises:

calculating a difference between a pose to which the key joint data is applied and the at least one candidate pose;

calculating a weighting factor of the at least one candidate pose based on the calculated difference;

obtaining a weighted sum of the at least one candidate pose based on the calculated weighting factor; and retrieving a pose generated by the weighted sum as the most likely pose.

43. The method of claim 30, further comprising:

calculating a momentum of the object based on a sum of distances between a plurality of determined most likely poses respectively retrieved for each of a plurality of frames of the image.

44. The method of claim 43, wherein calculating of the momentum further comprises:

calculating each distance between key joints in a same position among a plurality of key joints of a current frame and a plurality of key joints of a previous frame; and summing up distances that are equal to or greater than a threshold among the calculated distances to calculate the momentum.

45. A method, the method comprising:

analyzing an image to detect key joint data regarding respective plural key joints of an object in the image; and generating at least one candidate pose for the object based on the detected key joint data;

calculating a pose likelihood value of the at least one candidate pose based on the key joint data;

calculating a pose naturalness measurement value of the at least one candidate pose based on a pose database; and retrieving a most likely pose based on the pose likelihood measurement value and the pose naturalness measurement value.

* * * * *